(12) United States Patent
Poon

(10) Patent No.: US 12,242,815 B1
(45) Date of Patent: Mar. 4, 2025

(54) METHOD AND APPARATUS FOR DATA PROCESSING, COMPUTER, STORAGE MEDIUM, AND PROGRAM PRODUCT

(71) Applicant: iCALC Holdings Limited, Hong Kong (CN)

(72) Inventor: HoMan Poon, Hong Kong (CN)

(73) Assignee: ICALC HOLDINGS LIMITED, Hong Kong (CN)

( * ) Notice: Subject to any disclaimer, the term of this patent is extended or adjusted under 35 U.S.C. 154(b) by 0 days.

(21) Appl. No.: 18/933,313

(22) Filed: Oct. 31, 2024

(30) Foreign Application Priority Data

Sep. 14, 2024  (CN) .......................... 202411295723.9

(51) Int. Cl.
| | |
|---|---|
| *G06F 16/35* | (2019.01) |
| *B64F 5/60* | (2017.01) |
| *G06F 40/205* | (2020.01) |
| *G06F 40/279* | (2020.01) |
| *G06F 40/35* | (2020.01) |
| *G06T 11/20* | (2006.01) |

(52) U.S. Cl.
CPC ................ *G06F 40/35* (2020.01); *B64F 5/60* (2017.01); *G06F 16/35* (2019.01); *G06F 40/205* (2020.01); *G06F 40/279* (2020.01); *G06T 11/206* (2013.01)

(58) Field of Classification Search
CPC ........ G06F 40/35; G06F 16/35; G06F 40/279; G06F 40/205; B64F 5/60; G06T 11/206
See application file for complete search history.

(56) References Cited

U.S. PATENT DOCUMENTS

2022/0179889 A1* 6/2022 Zhang ................. G06F 16/3347

* cited by examiner

*Primary Examiner* — Truong V Vo
(74) *Attorney, Agent, or Firm* — HAUPTMAN HAM, LLP

(57) ABSTRACT

A method for data processing, a computer, and a storage medium are provided. A service processing request text sent by a first service object is obtained on an intelligent conversation page, and the service processing request text is parsed to obtain service semantic information and intention requirement information. A service database associated with the first service object is determined. A first target type indicated by the service semantic information is obtained, and a first service data set of the first target type is obtained from classified data corresponding to N service types in the service database respectively. Information retrieval is performed in the first service data set to obtain retrieval content associated with the first target component, a service result for the service processing request text is generated based on the intention requirement information and the retrieval content, and the service result is displayed on the intelligent conversation page.

20 Claims, 7 Drawing Sheets

METHOD AND APPARATUS FOR DATA PROCESSING, COMPUTER, STORAGE MEDIUM, AND PROGRAM PRODUCT

CROSS-REFERENCE TO RELATED APPLICATIONS

This application claims priority under 35 U.S.C. § 119(a) to Chinese Patent Application No. 202411295723.9, filed Sep. 14, 2024, the entire disclosure of which is incorporated herein by reference.

TECHNICAL FIELD

This disclosure relates to the field of computer technology, in particular to a method and an apparatus for data processing, a computer, a storage medium, and a program product.

BACKGROUND

With the progress of science and technology, information management technology has been highly developed. The transformation of file storage from paper archives to electronic file storage has realized the evolution from traditional to digitalization. Computer technology, scanning, and optical character recognition (OCR) technology have been introduced in the electronic file storage, which makes file storage, management, and retrieval more efficient and flexible. The traditional storage manner is key-value store. In this method, only when a key is completely consistent with a value during retrieval, corresponding content can be retrieved from the database, which has a low efficiency and a high retrieval threshold.

SUMMARY

In an aspect, a method for data processing is provided in implementations of the present disclosure. The method for data processing includes the following. A service processing request text sent by a first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text. A first object identifier of the first service object is obtained, and a service database associated with the first object identifier is determined based on the first object identifier, where the service database includes storage data associated with virtual asset-associated data corresponding to N service types respectively, virtual asset-associated data corresponding to each of the N service types includes component asset data of at least one component of an aircraft, and N is a positive integer. A first target type indicated by the service semantic information is obtained, a first service data set of the first target type is obtained from classified data corresponding to the N service types in the service database respectively, and a first target component associated with the service semantic information is determined based on the service semantic information, where the N service types include the first target type. Information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

In an aspect, a computer device is provided in implementations of the present disclosure. The computer device includes a processor, a memory, and an input/output (I/O) interface. The I/O interface is configured to receive and output data. The memory is configured to store a computer program. The processor is connected to the memory and the I/O interface and configured to invoke the computer program, to cause the computer device to perform the following operations. A service processing request text sent by a first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text. A first object identifier of the first service object is obtained, and a service database associated with the first object identifier is determined based on the first object identifier, where the service database includes storage data associated with virtual asset-associated data corresponding to N service types respectively, virtual asset-associated data corresponding to each of the N service types includes component asset data of at least one component of an aircraft, and N is a positive integer. A first target type indicated by the service semantic information is obtained, a first service data set of the first target type is obtained from classified data corresponding to the N service types in the service database respectively, and a first target component associated with the service semantic information is determined based on the service semantic information, where the N service types include the first target type. Information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

In an aspect, a non-transitory computer-readable storage medium is provided in implementations of the present disclosure. The computer-readable storage medium is configured to store a computer program which, when loaded and executed by a processor, causes a computer device equipped with the processor to perform the following operations. A service processing request text sent by a first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text. A first object identifier of the first service object is obtained, and a service database associated with the first object identifier is determined based on the first object identifier, where the service database includes storage data associated with virtual asset-associated data corresponding to N service types respectively, virtual asset-associated data corresponding to each of the N service types includes component asset data of at least one component of an aircraft, and N is a positive integer. A first target type indicated by the service semantic information is obtained, a first service data set of the first target type is obtained from classified data corresponding to the N service types in the service database respectively, and a first target component associated with the service semantic information is determined based on the service semantic information, where the N service types include the first target type. Information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

BRIEF DESCRIPTION OF THE DRAWINGS

In order to describe more clearly technical solutions of the present disclosure or the related art, the following will give a brief introduction to the accompanying drawings used for describing implementations or the related art. Apparently, the accompanying drawings described below are some implementations of the present disclosure. Based on these drawings, those of ordinary skill in the art can also obtain other drawings without creative effort.

DETAILED DESCRIPTION

The following will describe technical solutions of implementations of the present disclosure with reference to the accompanying drawings in implementations of the present disclosure. Apparently, implementations described herein are merely some implementations, rather than all implementations, of the present disclosure. Based on the implementations of the present disclosure, all other implementations obtained by those of ordinary skill in the art without creative effort shall fall within the protection scope of the present disclosure.

In the present disclosure, if it is necessary to collect object (e.g., user, etc.) data, a prompt interface or a pop-up window is displayed before and during collection. The prompt interface or the pop-up window is used for prompting the user that related data is currently being collected. Only when a confirmation operation performed by the user on the prompt interface or the pop-up window is obtained, related operations of obtaining the related data will be performed, otherwise, the related operations are ended. Additionally, the obtained user data will be used in reasonable and legal scenarios or purposes. Optionally, in some scenarios where the user data is required but not authorized by the user, authorization can be requested from the user, and the user data can be used when the authorization is approved.

It can be understood that the specific implementations of the present disclosure relate to the user data. User permission or consent needs to be obtained when the foregoing implementations of the present disclosure are applicable to specific products or technologies, and the collection, use, and processing of the related data need to comply with relevant laws, regulations, and standards of relevant countries and regions.

Figure 1:
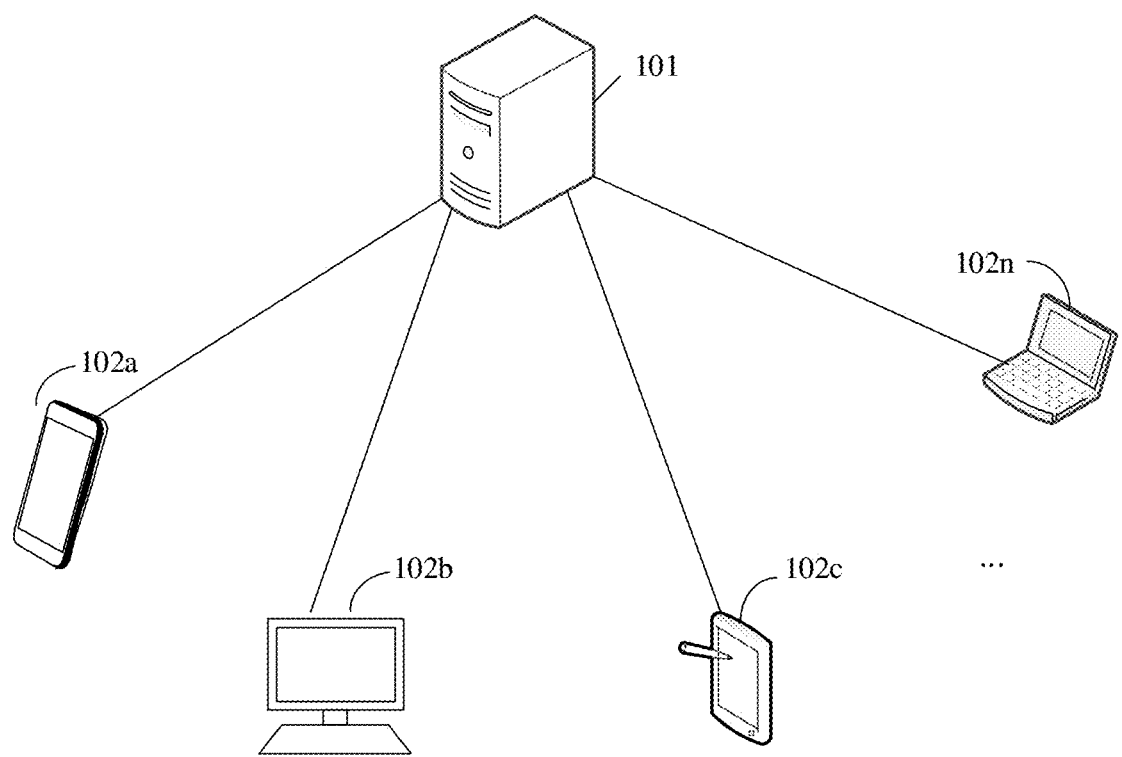
FIG. 1 is an architectural diagram of a network interaction provided in implementations of the present disclosure.

In implementations of the present disclosure, reference can be made to FIG. 1, which is an architecture diagram of a network interaction provided in implementations of the present disclosure. As illustrated in FIG. 1, the architecture diagram of the network interaction can include a service server 101 and a terminal device cluster. The terminal device cluster can include terminal device 102a, terminal device 102b, terminal device 102c, . . . , and terminal device 102n. There may be a communication connection in the terminal device cluster, for example, there is a communication connection between terminal device 102a and terminal device 102b, and there is a communication connection between terminal device 102a and terminal device 102c. Meanwhile, any terminal device in the terminal device cluster may have a communication connection with the service server 101, for example, there is a communication connection between terminal device 102a and the service server 101. A connection manner of the communication connection is not limited, and the communication connection may be directly or indirectly connected in a wired communication manner, or may be directly or indirectly connected in a wireless communication manner, or may be in other manners, which is not limited in the present disclosure.

It can be understood that each terminal device in the terminal device cluster illustrated in FIG. 1 can be installed with an application client having a data processing function. When the application client is run on each terminal device, the application client can display an intelligent conversation page and perform data interaction with the service server 101 illustrated in FIG. 1, so that the service server 101 can receive service data from each terminal device. The application client may be a social application, an instant messaging application, a live streaming application, a short video application, a video application, a music application, a shopping application, a novel application, a browser, and other application clients with functions of displaying text, images, audio, video, and other data information. The application client may be an independent client or an embedded sub-client (e.g., an application applet, browser web page access, etc.) integrated in a client (i.e., an instant messaging client, a social client, a video client, etc.), which is not limited herein.

As illustrated in FIG. 1, any terminal device in the terminal device cluster can send a service processing request text to the service server 101 on the intelligent conversation page. For illustrative purposes, terminal device 102a is taken as a terminal device corresponding to a first service object.

The service server 101 can obtain the service processing request text sent by the first service object on the intelligent conversation page, that is, the first service object can send the service processing request text on an intelligent conversation page of terminal device 102a. Terminal device 102a displays an object avatar of the first service object and an object message text box associated with the object avatar on the intelligent conversation page, where the object message text box includes the service processing request text. Terminal device 102a can send the service processing request text to the service server 101 on the intelligent conversation page, so that the service server 101 receives the service processing request text and performs subsequent operations on the service processing request text. The service server 101 can parse the service processing request text by using a natural language processing (NLP) technology to obtain service semantic information and intention requirement information. For example, the service processing request text can be "Help me retrieve a lease contract of an XX aircraft, and generate a curve of rental change for the XX aircraft according to retrieval content", the service semantic information obtained after the service processing request text is parsed out by the service server can include "Retrieve the lease contract of the XX aircraft in a transaction service data type, and generate the curve of rental change for the XX aircraft according to the lease contract", and the intention requirement information can indicate a retrieval requirement and a drawing processing requirement.

The service server 101 can obtain a first object identifier of the first service object, and determine, based on the first object identifier, a service database associated with the first object identifier, i.e., a database for storing various data uploaded by the first service object. The service database includes virtual asset-associated data corresponding to N service types of an aircraft respectively, virtual asset-associated data corresponding to each of the N service types includes component asset data of at least one component of the aircraft, and N is a positive integer. The aircraft may be transportation equipment for navigation (i.e., an airplane, etc.), or may be related components that constitute the transportation equipment. For example, when the aircraft is an airplane, the related components that constitute the airplane may include an engine, a fuselage, a landing gear, etc., and the engine, the fuselage, the landing gear, and other components can all be taken as the aircraft of the present disclosure. The service server 101 can obtain a first target type indicated by the service semantic information, and obtain, from classified data corresponding to the N service types in the service database respectively, a first service data set of the first target type. Further, the service server 101 can determine a first target component associated with the service semantic information based on the service semantic information. The N service types include the first target type.

The service server 101 can perform information retrieval in the first service data set to obtain retrieval content associated with the first target component, and generate a service result for the service processing request text based on the intention requirement information and the retrieval content. Further, the service server 101 can send the service result to terminal device 102a, so that terminal device 102a displays, on the intelligent conversation page, an intelligent avatar and an intelligent message text box that is associated with the intelligent avatar and includes the service result, where the intelligent avatar is used for performing conversational interaction with the object avatar on the intelligent conversation page.

Through the above process, the classified storage of files (the virtual asset-associated data) based on the service type is realized, which reduces the retrieval volume during retrieval and improves the retrieval efficiency. In addition, intelligent management on a file system is implemented by an intelligent object. The intelligent object is used to obtain a service requirement (the service processing request text) of the first service object and parse out the service semantic information of the service processing request text. Based on the service semantic information, targeted intelligent retrieval is performed in the file system based on the service semantic information, and the service result is quickly determined and displayed on the intelligent conversation page. The data is classified and stored based on the N service types, and in a subsequent data reading process of a certain target component (e.g., the first target component) of the aircraft in a certain specified service type (e.g., the first target type), only data corresponding to the first target component in the first target type needs to be retrieved, thus reducing the retrieval threshold, saving data retrieval time, and improving data reading and retrieval efficiency. Further, a whole retrieval process is completed by the intelligent object, thereby saving labor costs.

Figure 2:
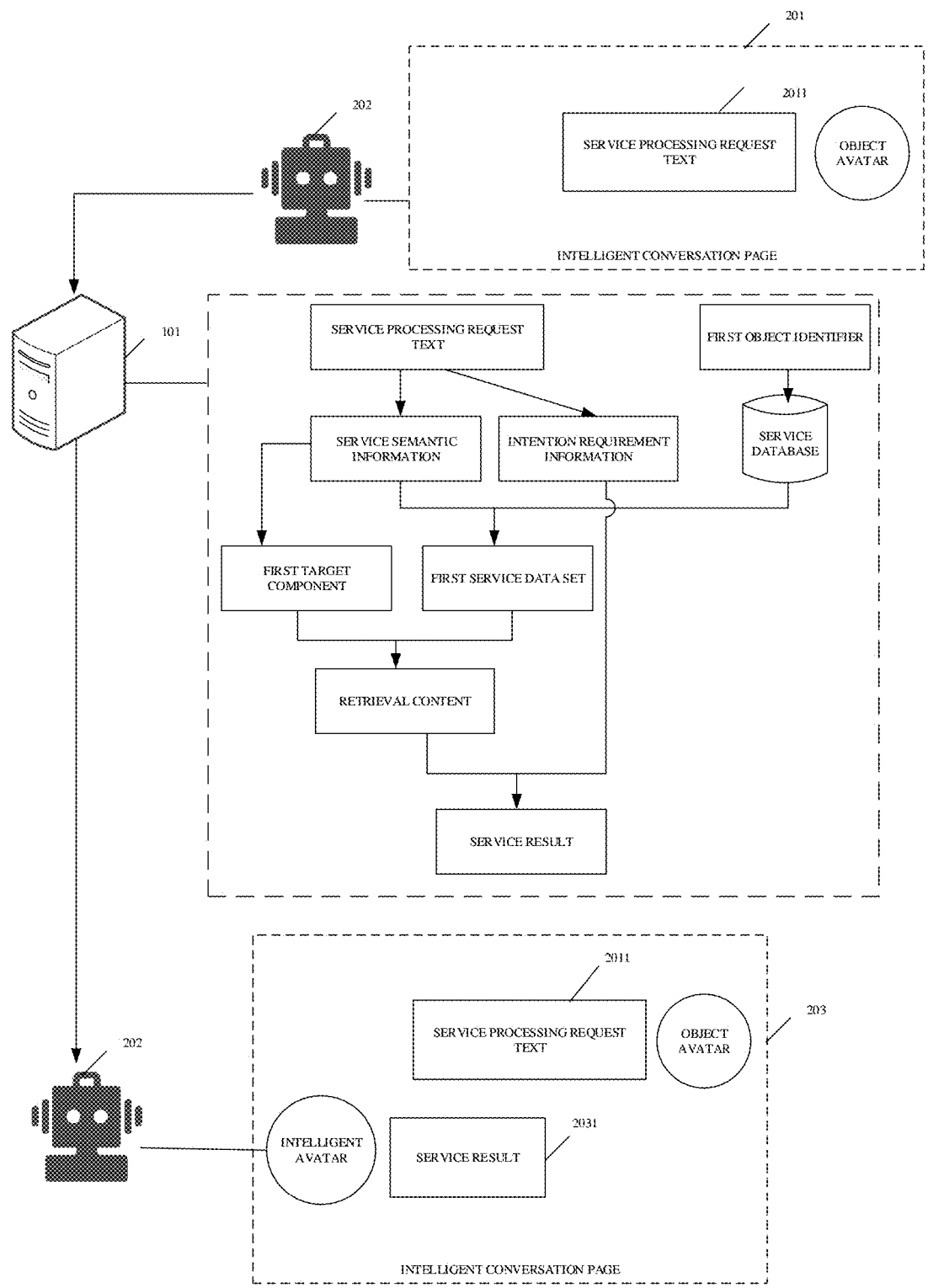
FIG. 2 is a schematic diagram of a scenario of a method for data processing provided in implementations of the present disclosure.

Specifically, reference can be made to FIG. 2, which is a schematic diagram of a scenario of a method for data processing provided in implementations of the present disclosure. As illustrated in FIG. 2, on an intelligent conversation page 201 of terminal device 102a, an object avatar of a first service object and an object message text box 2011 associated with the object avatar are displayed, where the object message text box 2011 includes a service processing request text sent by the first service object. An intelligent object 202 of terminal device 102a can obtain the service processing request text and send the service processing request text to a service server 101. It can be understood that the intelligent object 202 can be provided by a service provider of the service server 101, and the intelligent object 202 processes the service processing request text and obtains a corresponding result by using the server 101. The service server 101 can parse the service processing request text to obtain service semantic information and intention requirement information. The service server 101 can obtain a first object identifier of the first service object, where the first object identifier can be a unique indicative identifier created and assigned by the service server 101 when the first service object uses an application client provided by the service server 101 to create an object account. The service server 101 can determine a service database associated with the first object identifier based on the first object identifier, where the service database includes virtual asset-associated data corresponding to N service types respectively, virtual asset-associated data corresponding to each of the N service types includes component asset data of at least one component of an aircraft, and N is a positive integer. In other words, when the first service object creates an account and uploads data in the application client, the service server 101 can classify the uploaded data (divided into data corresponding to the N service types respectively) and store it in the service database corresponding to the first service object. The service server 101 can obtain a first target type indicated by the service semantic information, obtain, from classified data corresponding to the N service types in the service database respectively, a first service data set of the first target type, and determine a first target component associated with the service semantic information based on the service semantic information, where the N service types include the first target type. The service server 101 can perform information retrieval in the first service data set to obtain retrieval content associated with the first target component, and generate a service result for the service processing request text based on the intention requirement information and the retrieval content. Further, the service server 101 sends the generated service result to terminal device 102a, and the intelligent object of terminal device 102a displays the service result on the intelligent conversation page. As illustrated on the intelligent conversation page 203, the object avatar, the object message text box 2011 (displaying the service processing request text), the intelligent avatar of the intelligent object 202, and an intelligent message text box 2031 (displaying the service result). The intelligent avatar is used for performing conversational interaction with the object avatar on the intelligent conversation page. In other words, the first service object can consult a certain content (the service processing request text) on the intelligent conversation page, and the intelligent object obtains a consulting content text to perform intelligentization processing and obtains a final service result to reply to the consultation from the first service object.

Through the above process, the classified storage of files (the virtual asset-associated data) based on the service type is realized, which reduces the retrieval volume during retrieval and improves the retrieval efficiency. In addition, intelligent management on a file system is implemented by the intelligent object. The intelligent object is used to obtain a service requirement (the service processing request text) of the first service object and parse out the service semantic information of the service processing request text. Based on the service semantic information, targeted intelligent retrieval is performed in the file system based on the service semantic information, and the service result is quickly determined and displayed on the intelligent conversation page. The data is classified and stored based on the N service types, and in a subsequent data reading process of a certain target component (e.g., the first target component) of the aircraft in a certain specified service type (e.g., the first target type), only data corresponding to the first target component in the first target type needs to be retrieved, thus reducing the retrieval threshold, saving data retrieval time, and improving data reading and retrieval efficiency. Further, a whole retrieval process is completed by the intelligent object, thereby saving labor costs.

It can be understood that the terminal device mentioned in implementations of the present disclosure may also be a computer device, and the computer device in the implementations of the present disclosure includes but is not limited to a terminal device or a server. In other words, the computer device may be a server or a terminal device, or may be a system composed of a server and a terminal device. The terminal device mentioned above may be an electronic device, including but not limited to a mobile phone, a tablet computer, a desktop computer, a laptop computer, a palmtop computer, an in-vehicle device, an augmented reality/virtual reality (AR/VR) device, a helmet display, an intelligent television, a wearable device, an intelligent sound box, a digital camera, a camera, other mobile Internet devices (MIDs) that has a network access capability, or a terminal device in a scenario such as a train, a ship, or a flight. As illustrated in FIG. 1, the terminal device may be a mobile phone (as illustrated in terminal device 102a), a desktop computer (as illustrated in terminal device 102b), a tablet computer (as illustrated in terminal device 102c), or a laptop computer (as illustrated in terminal device 102n), etc. Only some of the devices are exemplified in FIG. 1. The server mentioned above may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a vehicle infrastructure cooperative system, a content distribution network (CDN), big data, an artificial intelligence platform, etc.

Optionally, the data involved in implementations of the present disclosure may be stored in a computer device, or may be stored based on a cloud storage technology or a blockchain network, which is not limited herein.

Figure 3:
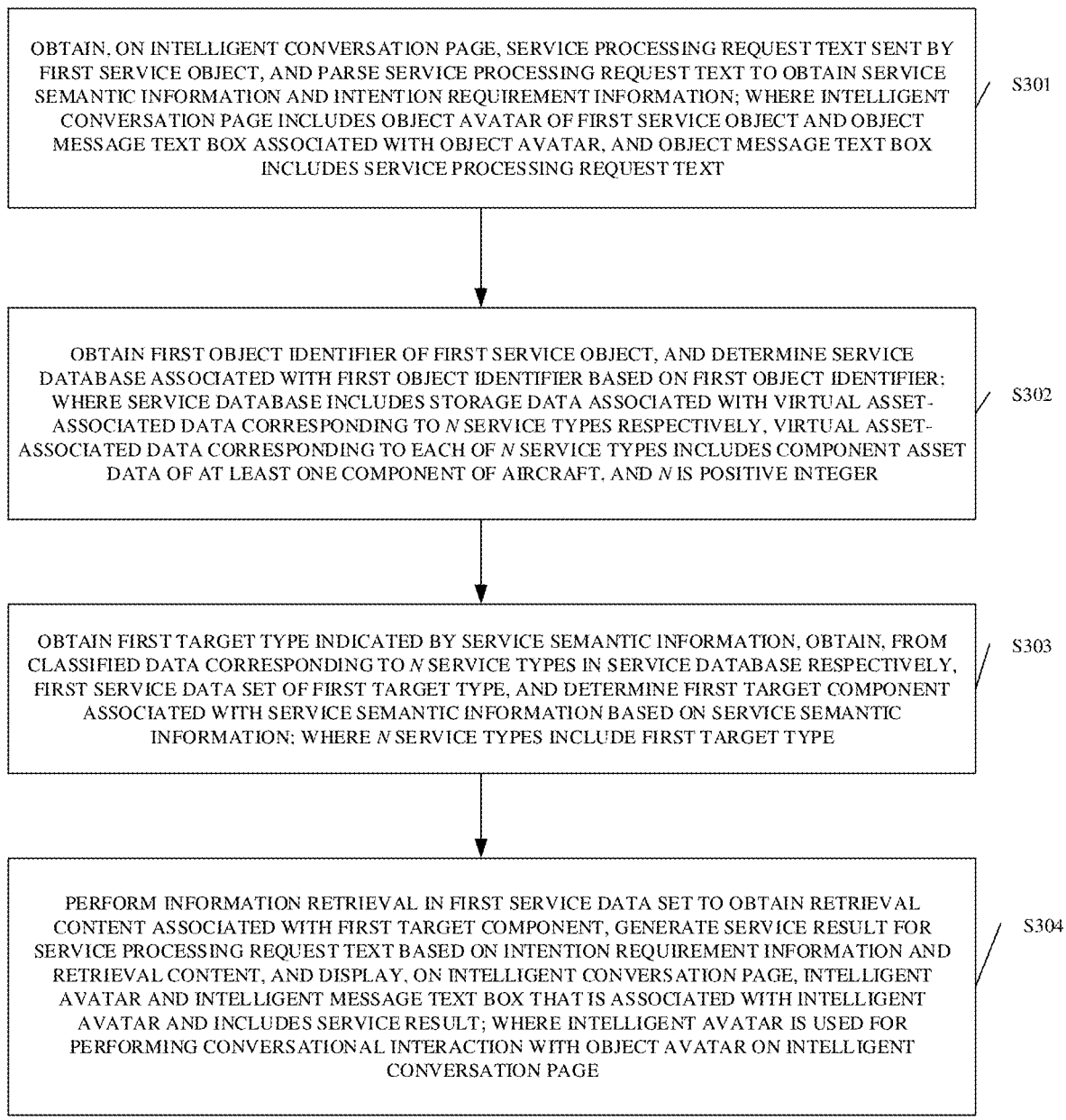
FIG. 3 is a flowchart I of a method for data processing provided in implementations of the present disclosure.

Further, reference can be made to FIG. 3, which is a flowchart I of a method for data processing provided in implementations of the present disclosure. The method for data processing can be implemented by a computer device, and the computer device can be the service server 101 illustrated in FIG. 1 or any terminal device in a terminal device cluster. For illustrative purposes, the method for data processing is implemented by the computer device. The method for data processing can at least include operations at S301 to S304 as follows.

S301, a service processing request text sent by a first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text.

In implementations of the present disclosure, the computer device can obtain the service processing request text sent by the first service object on the intelligent conversation page, and parse the service processing request text by using the NLP technology to obtain the service semantic information and the intention requirement information that are indicated by the service processing request text. Optionally, the computer device can also parse the service processing request text by using pre-trained language models (PLMs) to obtain the service semantic information and the intention requirement information that are indicated by the service processing request text. The PLMs have a strong context understanding and semantic capture capability, which can improve the accuracy and adaptability of retrieval by using dynamic embedding and context-awareness mechanism. The PLMs may be bidirectional encoder representations from transformers (BERT), a generative pre-trained transformer (GPT), a text-to-text transfer transformer (T5), etc., which is not limited herein. In addition, in the PLMs, a self-supervised learning method can be used for predicting a masked word or predicting a next sentence, so that higher retrieval performance and wider application scenario coverage can be achieved with less annotated data. The intelligent conversation page includes the object avatar of the first service object and the object message text box associated with the object avatar, and the object message text box includes the service processing request text. The service semantic information refers to specific execution content indicated by the service processing request text, i.e., information that is extracted from the service processing request text and can reflect the service content and logic, and the intention requirement information refers to a specific intention or requirement expressed by the service processing request text. For example, the service processing request text can be "Help me retrieve a lease contract of an XX aircraft, and generate a curve of rental change for the XX aircraft according to retrieval content", the service semantic information obtained after the service processing request text is parsed out by the computer device can include "Retrieve the lease contract of the XX aircraft in a transaction service data type, and generate the curve of rental change for the XX aircraft according to the lease contract", and the intention requirement information can indicate a retrieval requirement and a drawing processing requirement.

S302, a first object identifier of the first service object is obtained, and a service database associated with the first object identifier is determined based on the first object identifier, where the service database includes storage data associated with virtual asset-associated data corresponding to N service types respectively, virtual asset-associated data corresponding to each of the N service types includes component asset data of at least one component of the aircraft, and N is a positive integer.

In implementations of the present disclosure, the computer device can obtain the first object identifier of the first service object. When the computer device obtains the service processing request text sent by the first service object, the computer device can simultaneously obtain account information of the first service object, and obtain the first object identifier of the first service object from the account information. The first object identifier is a unique indicative identifier obtained when the first service object creates an object account in an application client corresponding to the intelligent conversation page. The computer device can determine the service database associated with the first object identifier based on the first object identifier, where the service database includes the virtual asset-associated data corresponding to the N service types respectively, the virtual asset-associated data corresponding to each of the N service types includes the component asset data of the at least one component of the aircraft, and N is a positive integer. The service database is a database allocated by the application client to the first service object in a data repository or in a cloud for data storage when the first service object uploads data to the application client. Take an engine as an example of the aircraft. Virtual asset-associated data of the aircraft can include use data, accident proof data, asset depreciation data, previous maintenance data, property right certificate data, and transaction data, which are data of components of the engine. For example, the use data of the components of the engine includes flight-related data when the components are installed in the engine and the engine is installed in the airplane, such as a flight duration, a flight area, etc. The accident proof data of the components of the engine includes proof data that the components have suffered from fire, water ingress, falling, or other accidents. The asset depreciation data of the components of the engine includes different flight discount rates of flight areas when the components are installed in the engine and the engine is installed in the airplane, where different flight areas have different flight discount rates because a worse environment leads to a greater impact on the engine performance. The previous maintenance data of the components of the engine includes maintenance time of the components, a maintenance place of the components, a recovery performance ratio after maintenance of the components, and other data. The property right certificate data of the components of the engine includes a factory license certificate, a production license certificate, a manufacturer, a quasi-flight proof of the components, and so on. The transaction data of the components of the engine includes lease-associated data of the components such as lease time of the components, lease amount, and a return status of the components after the lease, buy and sell associated data of the components such as a buy and sell amount of the components, buy and sell time of the components, and so on, and refit-associated data of the components such as a refit amount of the components, refit time of the components, and so on. Virtual asset-associated data of the components of the engine (including usage data, accident proof data, asset depreciation data, previous maintenance data, property right certificate data, transaction data, etc.) together constitute virtual asset-associated data of the engine.

S303, a first target type indicated by the service semantic information is obtained, a first service data set of the first target type is obtained from classified data corresponding to the N service types in the service database respectively, and a first target component associated with the service semantic information is determined based on the service semantic information, where the N service types include the first target type.

In implementations of the present disclosure, the computer device can obtain the first target type indicated by the service semantic information. For example, the N service types in the service database are an asset service data type, a basic service data type, and a transaction service data type, respectively. Keywords of the service semantic information indicate comparison with the basic service data type, and thus the first target type is the basic service data type. The computer device can obtain the first service data set of the first target type from the classified data corresponding to the N service types in the service database respectively. When the first target type is the basic service data type, the first service data set obtained by the computer device includes all virtual asset-associated data whose service type is the basic service data type. The computer device can determine the first target component associated with the service semantic information based on the service semantic information. In other words, the computer device continues to compare with specific components of the aircraft in the basic service data type based on the keywords of the service semantic information, and determines a matched component as the first target component. The N service types include the first target type.

S304, information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

In implementations of the present disclosure, the computer device can perform information retrieval in the service data set to obtain the retrieval content associated with the first target component. In other words, after the computer device determines that the service type is the first target type and a specific component is the first target component, the computer device needs to retrieve specific virtual asset-associated data that is indicated by the service processing request text and is associated with the first target component in the first service data set. For example, the first service data set includes virtual asset-associated data 1 of component 1, virtual asset-associated data 2 of component 1, virtual asset-associated data 3 of component 1, virtual asset-associated data 4 (lease contract) of component 2, virtual asset-associated data 5 (invoice) of component 2, and virtual asset-associated data 6 of component 2. If the service semantic information indicates that a lease contract of component 2 needs to be obtained, a final retrieval content is virtual asset-associated data 4. If the service semantic information indicates that invoice information of component 2 needs to be obtained, the final retrieval content is virtual asset-associated data 5.

Further, the computer device can generate the service result for the service processing request text based on the intention requirement information and the retrieval content. In other words, when the intention requirement information is a drawing requirement (e.g., drawing a curve of rent change), the computer device can draw the curve of rent change according to the retrieval content (lease contract, including a rent field), and jointly determine the curve of rent change and the retrieval content as the service result for the service processing request text. Further, the computer device can display the intelligent avatar and the intelligent message text box that is associated with the intelligent avatar and includes the service result on the intelligent conversation page. The intelligent avatar is used for performing conversational interaction with the object avatar on the intelligent conversation page, that is, the intelligent object performs conversational interaction with the first service object.

It can be understood that all operations implemented by the computer device in the above process can be completed by the computer device invoked by the intelligent object after the service processing request text sent by the first service object is received by the intelligent object.

Through the above process, the classified storage of files (virtual asset-associated data) based on the service type is realized, which reduces the retrieval volume during retrieval and improves the retrieval efficiency. In addition, intelligent management on a file system is implemented by the intelligent object. The intelligent object is used to obtain a service requirement (the service processing request text) of the first service object and parse out the service semantic information of the service processing request text. Based on the service semantic information, targeted intelligent retrieval is performed in the file system based on the service semantic information, and the service result is quickly determined and displayed on the intelligent conversation page. The data is classified and stored based on the N service types, and in a subsequent data reading process of a certain target component (e.g., the first target component) of the aircraft in a certain specified service type (e.g., the first target type), only data corresponding to the first target component in the first target type needs to be retrieved, thus reducing the retrieval threshold, saving data retrieval time, and improving data reading and retrieval efficiency. Further, a whole retrieval process is completed by the intelligent object, thereby saving labor costs.

Figure 4:
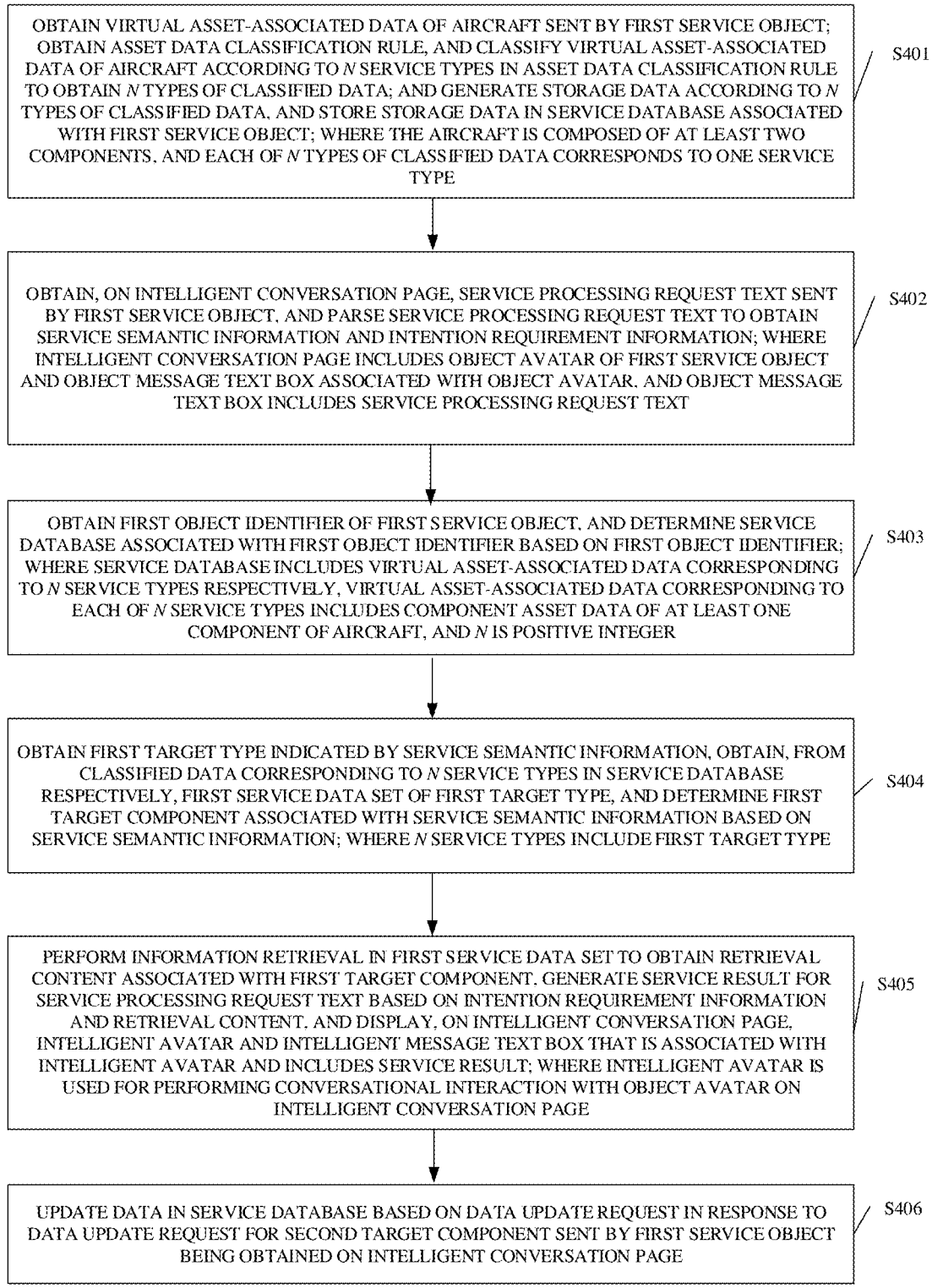
FIG. 4 is a flowchart II of a method for data processing provided in implementations of the present disclosure.

Further, reference can be made to FIG. 4, which is a flowchart II of a method for data processing provided in implementations of the present disclosure. The method for data processing can be implemented by a computer device, and the computer device can be the service server 101 illustrated in FIG. 1 or any terminal device in a terminal device cluster. For illustrative purposes, the method for data processing is implemented by the computer device. The method for data processing can at least include operations at S401 to S406 as follows.

S401, virtual asset-associated data of an aircraft sent by a first service object is obtained. An asset data classification rule is obtained, and the virtual asset-associated data of the aircraft is classified according to N service types in the asset data classification rule to obtain N types of classified data. Storage data is generated according to the N types of classified data, and the storage data is stored in a service database associated with the first service object. The aircraft is composed of at least two components, and each of the N types of classified data corresponds to one service type.

In implementations of the present disclosure, the computer device can obtain the virtual asset-associated data of the aircraft sent by the first service object. The virtual asset-associated data of the aircraft can include aircraft usage data, aircraft accident proof data, asset depreciation data, previous maintenance data, property certificate data, transaction data (e.g., lease-associated data), etc., of the aircraft. The aircraft can be composed of at least two components, and the virtual asset-associated data of the aircraft can include component usage data, component accident proof data, component asset depreciation data, component previous maintenance data, component property certificate data, component transaction data, etc., of each component. The computer device can obtain the asset data classification rule, and the N service types in the asset data classification rule for data classification can be manually specified. For example, the N service types can include an asset service data type, a basic service data type, and a transaction service data type. Data corresponding to the asset service data type can be data used for recording aircraft depreciation, such as component usage data, component accident certificate data, component asset depreciation data, component previous maintenance data, etc., of the aircraft. Data corresponding to the basic service data type can be property right certificate data of the aircraft, such as the property certificate data of the aircraft (such as component factory license certificate, quasi-flight proof of the components, etc.). Data corresponding to the transaction service data type can be transaction-associated data of the aircraft (such as lease-associated data of the aircraft, buy and sell associated data of the aircraft, refit-associated data of the aircraft, lease-associated data of the aircraft component, buy and sell associated data of the aircraft component, refit-associated data of the aircraft component, etc.).

The computer device can classify the virtual asset-associated data of the aircraft according to the N service types in the asset data classification rule to obtain the N types of classified data. For example, the virtual asset-associated data of the aircraft of the same service type can be classified into one category. If there are N service types, the virtual asset-associated data of the aircraft can be classified into N categories. The N types of classified data can include first classified data, second classified data, and third classified data. The computer device can classify the virtual asset-associated data of the aircraft to obtain the N types of classified data as follows. A data key field corresponding to the asset service data type is obtained, where the data key field includes a usage record key field, a maintenance record key field, and a depreciation record key field. Then, a previous usage record corresponding to the usage record key field, a previous maintenance record corresponding to the maintenance record key field, and a previous depreciation record corresponding to the depreciation record key field can be obtained from the virtual asset-associated data of the aircraft, and the previous usage record, the previous maintenance record, and the previous depreciation record are determined as the first classified data corresponding to the asset service data type. A factory key field corresponding to the basic service data type can be obtained, factory-associated data corresponding to the factory key field is obtained from the virtual asset-associated data of the aircraft, and the factory-associated data is determined as the second classified data corresponding to the basic service data type. A transaction key field corresponding to the transaction service data type can be obtained, transaction-associated data corresponding to the transaction key field is obtained from the virtual asset-associated data of the aircraft, and the transaction-associated data is determined as the third classified data corresponding to the transaction service data type.

It can be understood that each service type can correspond to each of different key fields, and each key field can correspond to one type of data. Therefore, data of different service types can be obtained from the virtual asset-associated data of the aircraft according to the different key fields. If the asset service data type can correspond to the usage record key field, the maintenance record key field, and the depreciation record key field, the previous usage record (such as the previous usage record of each component of the aircraft) can be obtained from the virtual asset-associated data of the aircraft according to the usage record key field, the previous maintenance record (such as the previous maintenance record of each component of the aircraft) can be obtained from the virtual asset-associated data of the aircraft according to the maintenance record key field, and the previous depreciation record (such as the previous accident record of each component of the aircraft) can be obtained from the virtual asset-associated data of the aircraft according to the depreciation record key field. The previous usage record, the previous maintenance record, and the previous depreciation record can all be taken as data corresponding to the asset service type. If the basic service data type can correspond to the factory key field, the factory-associated data (such as factory permit certificate, production permit certificate, etc.) can be obtained from the virtual asset-associated data of the aircraft according to the factory key field. If the transaction service data type can correspond to the transaction key field, the transaction-associated data (such as rent, lease term, return status after lease, etc.) can be obtained from the virtual asset-associated data of the aircraft according to the transaction key field.

Figure 5:
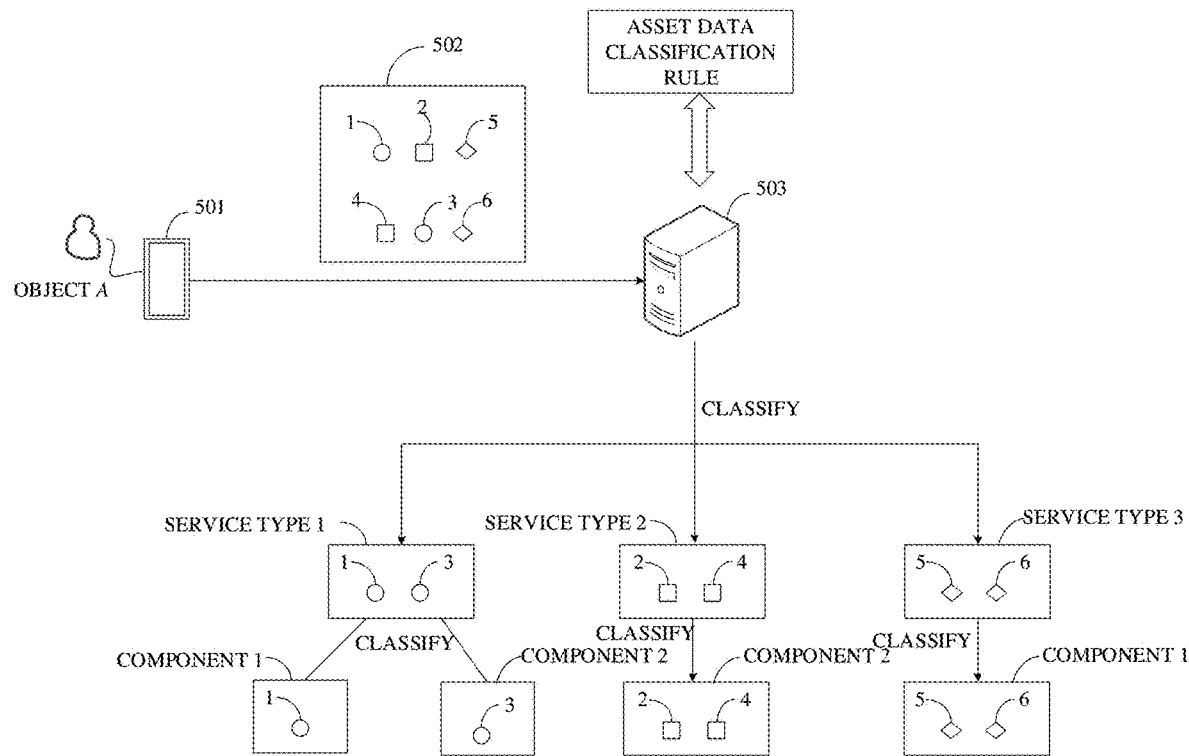
FIG. 5 is a schematic diagram of data classification provided in implementations of the present disclosure.

Further, reference can be made to FIG. 5, which is a schematic diagram of data classification provided in implementations of the present disclosure. As illustrated in FIG. 5, a terminal device 501 can be terminal device 102a mentioned above, an object a can be the first service object mentioned above, and the object a can send virtual asset-associated data 502 of an aircraft (composed of component 1 and component 2) to a computer device 503, where the virtual asset-associated data 502 of the aircraft can include virtual asset-associated data 1, virtual asset-associated data 2, virtual asset-associated data 3, virtual asset-associated data 4, virtual asset-associated data 5, and virtual asset-associated data 6. After the virtual asset-associated data 502 of the aircraft is received by the computer device 503, the computer device 503 can obtain an asset data classification rule which includes N service types (including service type 1, service type 2, and service type 3) for data classification. Further, the virtual asset-associated data 502 of the aircraft can be classified according to the N service types in the asset data classification rule. As illustrated in FIG. 5, from the virtual asset-associated data 502 of the aircraft (including virtual asset-associated data 1, virtual asset-associated data 2, virtual asset-associated data 3, virtual asset-associated data 4, virtual asset-associated data 5, and virtual asset-associated data 6), virtual asset-associated data (including virtual asset-associated data 1 and virtual asset-associated data 3) whose service type is service type 1 can be obtained, virtual asset-associated data (including virtual asset-associated data 2 and virtual asset-associated data 4) whose service type is service type 2 can be obtained, and virtual asset-associated data (including virtual asset-associated data 5 and virtual asset-associated data 6) whose service type is service type 3 can be obtained.

As illustrated in FIG. 5, virtual asset-associated data of one service type can be served as one type of classified data, and virtual asset-associated data of an item can be classified into three types of classified data according to service type 1, service type 2, and service type 3. The three types of classified data can include classified data of service type 1 (including virtual asset-associated data 1 and virtual asset-associated data 3), classified data of service type 2 (including virtual asset-associated data 2 and virtual asset-associated data 4), and classified data of service type 3 (including virtual asset-associated data 5 and virtual asset-associated data 6). Optionally, the computer device can further classify the virtual asset-associated data of each type of classified data according to components of the aircraft (including component 1 and component 2). For example, for the classified data of service type 1, since virtual asset-associated data 1 is virtual asset-associated data of component 1 and virtual asset-associated data 3 is virtual asset-associated data of component 2, the classified data of service type 1 can be further classified into two types of data (one type of data is virtual asset-associated data 1 of component 1 and the other type of data is virtual asset-associated data 3 of component 2). Similarly, for the classified data of service type 2, since both virtual asset-associated data 2 and virtual asset-associated data 4 are virtual asset-associated data of component 2, the classified data of service type 2 can be further classified into one type of data (virtual asset-associated data 2 of component 2 and virtual asset-associated data 4 of component 2). Similarly, for the classified data of service type 3, since both virtual asset-associated data 5 and virtual asset-associated data 6 are virtual asset-associated data of component 1, the classified data of service type 3 can be further classified into one type of data (virtual asset-associated data 5 of component 1 and virtual asset-associated data 6 of component 1).

Further, the computer device can generate storage data according to the N types of classified data and store the storage data in the service database associated with the first service object. Specifically, the N types of classified data include classified data $S_i$, and i is a positive integer less than or equal to N. The components of the aircraft include component $M_j$, and j is a positive integer. The classified data $S_i$ includes component asset data corresponding to A components respectively. The A components belong to the at least two components of the aircraft. The A components include the component $M_j$, and A is a positive integer. The following will describe a process of storing the classified data $S_i$ to illustrate a process of classified storage of the virtual asset-associated data of the aircraft uploaded by the first service object. The computer device can vectorize a service type corresponding to the classified data $S_i$ to obtain a type vectorized result. In other words, the computer device performs vector conversion on the text of the service type corresponding to the classified data $S_i$ to obtain a numerical form that can be processed by a machine learning algorithm. The computer device can perform word segmentation on the text of the service type to obtain a word segmentation result, and further perform data cleaning on the word segmentation result to obtain a data cleaning result. In other words, the text is segmented into words, phrases, or other meaningful units (referred to as "tokens"), and punctuation marks or stop words in the text that do not carry much meaning are removed. For example, there is a service type "The Asset Business Data Type", a segmentation result obtained after word segmentation is performed can be "["The", "Asset", "Business", "Data", "Type" ]", and a data cleaning result obtained after data cleaning is performed can be "["Asset", "Business", "Data", "Type" ]". Further, the data cleaning result can be mapped to vector space by word embedding to obtain the type vectorized result. Further, the computer device can vectorize the A components respectively to obtain A component vectorized results. The computer device can obtain a target component asset data of the component $M_j$ in the classified data $S_i$, and perform text parsing on the target component asset data based on a file type corresponding to the target component asset data to obtain a data parsing result corresponding to the target component asset data. The text parsing can be optical character recognition (OCR) parsing. For example, if the file type corresponding to the target component asset data is an image type (e.g., a PDF file), the computer device can, by OCR parsing, identify text information from an image type file and convert it into editable text to obtain the data parsing result. Optionally, the computer device can also perform text parsing on the target component asset data by directly using a multimodal large language model (MLLM, which can process text, images, or videos), such as an LLM. The computer device can perform text analysis on the target component asset data by using an OCR function of the LLM to obtain the data parsing result corresponding to the target component asset data. Since the LLM can not only process text and multimodal data such as images and videos, but also more naturally process a file including text and images by combining the text-to-image technology. As a result, the computer device does not need to first determine the file type corresponding to the target component asset data and then further perform OCR parsing according to different file types. Instead, the computer device can directly obtain the data parsing result corresponding to the target component asset data by using the LLM, thereby making file parsing more efficient. In addition, the LLM model can be updated by itself as data grows and the service requirement changes by using technologies such as federated learning or transfer learning, so that the efficient processing capability can be maintained. Optionally, the computer device (or the intelligent object) can determine a causal relationship according to contextual data by using a causal inference technology, thereby improving the intelligence of service processing and the reasoning capability for a complex problem. Further, the computer device vectorizes the data parsing result to obtain a data vectorized result corresponding to the target component asset data. The computer device determines the type vectorized result, the component vectorized result, and the data vectorized result as the storage data, and storing the storage data in the service database associated with the first service object. It can be understood that in this vectorized data storage manner, the computer device can distinguish different service types corresponding to different data according to different areas indicated by a coordinate position of data vectorized information (e.g., different data vectorized results) in the vector space.

Optionally, the computer device can determine the service type corresponding to the classified data $S_i$ as an initial root node, determine the A components as A parent nodes of the initial root node, obtain the target component asset data of the component $M_j$ in the classified data $S_i$, and convert formats of P component asset subdata in the target component asset data respectively to obtain P structured component asset subdata, where P is a positive integer. One component asset subdata is one virtual asset-associated data corresponding to one component of one service type. The computer device converts a format of one component asset subdata to obtain one structured component asset subdata as follows. The computer device uses a library in a programming language (such as a Python-docx library in a Python language) to read the component asset subdata, traverse content of the component asset subdata, i.e., traverse elements such as paragraphs, tables, and images of the component asset subdata, extract required important information (i.e., key content of the component asset subdata), construct a structured object according to the key content, and write the constructed structured object into a structured file to obtain the structured component asset subdata. The structured component asset subdata can be a structured file with a data format of Json. The computer device can allocate the P structured component asset subdata to child nodes of a parent node corresponding to the component $M_j$ respectively. When the child nodes of the parent nodes corresponding to the A components respectively are generated, the computer device can determine the initial root node, the A parent nodes, and child nodes corresponding to the A parent nodes respectively as a graph subtree of the classified data $S_i$, where one structured component asset subdata is allocated to one child node. When graph subtrees corresponding to the N types of classified data respectively are obtained, the computer device can determine the aircraft as a graph root node, generate an item knowledge graph corresponding to the aircraft based on the N graph subtrees and the graph root node, determine the item knowledge graph as the storage data, and store the storage data in the service database associated with the first service object. The graph root node is an entity node in the item knowledge graph, and the computer device can associate the N graph subtrees to the entity node to obtain the item knowledge graph corresponding to the aircraft. Optionally, the computer device can construct the item knowledge graph by using a multi-scale graph embedding technology, that is, entities in the item knowledge graph can have different representations in different contexts and scales. For example, an entity corresponding to a certain service type in the item knowledge graph is an asset service data type, and its scale representation can be a previous usage record, a previous maintenance record, a previous depreciation record, etc. That is, a concept of the entity is represented by the asset service data type, and specific details of the entity are represented by the previous usage record, the previous maintenance record, the previous depreciation record, etc. It can be understood that in this structured data storage manner, the computer device can distinguish different components or different service types corresponding to different data according to branch relationships of different nodes.

It is understandable that the storage data stored in the service database may be vectorized results or item knowledge graphs corresponding to the various data mentioned in operations at S302, or may be sequence vectorized results or sequence item knowledge graphs corresponding to various mark sequences (i.e., a token mark sequence) obtained after word segmentation is performed on the various data mentioned above. A process of obtaining the sequence vectorized results and the sequence item knowledge graphs is the same as that of obtaining the vectorized results or the item knowledge graphs corresponding to the various data.

It can be noted that in other data storage manners, i.e., a manner in which the computer device classifies the virtual asset-associated data according to the service type and then stores them directly, when information retrieval is performed based on the service semantic information subsequently, the computer device can adopt a contrastive learning-based multimodal model (contrastive language-graph pre-training (CLIP)), which can not only process text, but also process images, videos, and other formats of content, thereby realizing multimodal retrieval and enhancing the diversity and depth of the retrieval.

S402, a service processing request text sent by the first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text.

In implementations of the present disclosure, for a specific implementation process of operations at S402, reference can be made to the specific description of the operations at S301 as illustrated in FIG. 3, which is not repeated herein.

S403, a first object identifier of the first service object is obtained, and a service database associated with the first object identifier is determined based on the first object identifier, where the service database includes virtual asset-associated data corresponding to the N service types respectively, virtual asset-associated data corresponding to each of the N service types includes component asset data of at least one component of the aircraft, and N is a positive integer.

In implementations of the present disclosure, for a specific implementation process of operations at S403, reference can be made to the specific description of the operations at S302 as illustrated in FIG. 3, which is not repeated herein.

S404, a first target type indicated by the service semantic information is obtained, a first service data set of the first target type is obtained from classified data corresponding to the N service types in the service database respectively, and a first target component associated with the service semantic information is determined based on the service semantic information, where the N service types include the first target type.

In implementations of the present disclosure, for a data vectorized classification storage manner during data storage, i.e., the first data storage manner mentioned in the operations at S401, when the computer device obtains the first target type indicated by the service semantic information, the computer device can extract keywords of the service semantic information to obtain B service keywords, vectorize each of the B service keywords to obtain B keyword vectors, perform vector similarity comparison between the B keyword vectors and type vectorized results corresponding to the N service types respectively, and determine a service type corresponding to a matched type vectorized result as the first target type, where B is a positive integer. For a possible implementation for the computer device to perform vector similarity comparison, reference can be made to formula ①:

$$\text{cosine\_similarity}(A, B) = \frac{A \cdot B}{\|A\|\|B\|} \qquad ①$$

As illustrated in formula ①, cosine_similarity(A,B) indicates cosine similarity between vector A and vector B. In other words, the computer device can use a keyword vector as vector A and a type vectorized result as vector B to calculate cosine similarity, i.e., vector similarity, between the keyword vector and the type vectorized result. "·" indicates a dot product. A·B indicates a dot product result between vector A and vector B. $\|A\|$ indicates a magnitude of vector A, and $\|B\|$ indicates a magnitude of vector B. The computer device performs vector similarity comparison between the B keyword vectors and the type vectorized results corresponding to the N service types respectively. The vector similarity between the keyword vector and the type vectorized result also be determined by calculating Euclidean distance, Jaccard similarity, Manhattan distance, Pearson Correlation Coefficient, etc. between the keyword vector and the type vectorized result, which is not limited herein. A value range of the vector similarity is $[-1, 1]$. If a value of the vector similarity is close to 1, the two vectors are more similar.

The computer device can obtain, from the classified data corresponding to the N service types in the service database respectively, the first service data set of the first target type. The computer device can perform vector similarity comparison between keyword vectors corresponding to remaining service keywords respectively and a component vectorized result corresponding to each component in the first service data set respectively, and determine a component corresponding to a matched component vectorized result as the first target component associated with the service semantic information, where the remaining service keywords are service keywords other than a service keyword that match the type vectorized result corresponding to the first target type among the B service keywords. For example, the B service keywords include service keyword b, service keyword c, service keyword d, and service keyword f There may be a service keyword (e.g., service keyword b) among the B keywords that compares with a type vectorized result corresponding to one of the N service types, and the remaining service keywords include service keyword c, service keyword d, and service keyword f. The computer device can perform vector similarity comparison between keyword vectors corresponding to keyword c, service keyword d, and service keyword f respectively and the component vectorized result corresponding to each component in the first service data set respectively.

Optionally, for a data structured classification storage manner during data storage, i.e., the second data storage manner mentioned in the operations at S401, when the computer device obtains the first target type indicated by the service semantic information, the computer device can extract keywords of the service semantic information to obtain B service keywords, where B is a positive integer. The computer device can traverse the item knowledge graph based on the B service keywords, and when a type node that matches the B service keywords is traversed, the computer device determines a service type corresponding to the matched type node as the first target type. In other words, when a service keyword among the B service keywords is highly similar or identical to an initial root node of a certain indicative service type of a graph root node in the item knowledge graph, the initial root node of the certain indicative service type is considered to be the type node that matches the B service keywords, and the computer device can determine the service type corresponding to the type node as the first target type. For example, if the B service keywords include a service keyword indicating a basic service data type, a first target type matched by the computer device is the basic service data type. Optionally, the computer device can also retrieve the item knowledge graph by using the graph neural networks (GNNs) technology to determine the type node that matches the B service keywords. Specifically, the computer device can map the B service keywords to nodes in the item knowledge graph to generate service keyword embedding, and invoke a suitable GNN model to perform feature learning on the nodes in the item knowledge graph to generate node embedding. The GNN model can include different GNN models with different characteristics, such as the graph sample and aggregate (GraphSAGE) model and the graph attention networks (GAT), which is not limited herein. GraphSAGE is suitable for large-scale graph data, and GAT can capture different importance between nodes. It can be understood that the node embedding can capture semantic information of the node and structural information of the node in the item knowledge graph. Further, the computer device can calculate the similarity between service keyword embedding and the node embedding in the knowledge graph, determine a node associated with the maximum similarity as the type node, and determine a service type corresponding to the type node as the first target type. Further, the computer device can obtain, from the item knowledge graph, a first graph subtree with the first target type as an initial root node, and determine the first graph subtree as the first service data set. In other words, the computer device retrieves a graph subtree with the first target type as a root node from the item knowledge graph, and analyzes related entities and relationships corresponding to the nodes in the graph subtree, thereby constructing and determining the content of the first service data set. N graph subtrees in the item knowledge graph include the first graph subtree, that is, the first graph subtree includes the initial root node (the first target type currently) and all branch nodes of the initial root node. The computer device can traverse the first service data set based on a first keyword, and when a component node that matches the first keyword is traversed, the computer device determines the matched component node as the first target component associated with the service semantic information, where the first keyword is a service keyword indicating a component among the B service keywords. In other words, the computer device uses graph retrieval and reasoning algorithm to perform comparison between subnodes of the initial root node indicating the first target type in the first graph subtree with subnodes (including component nodes) that are identical or highly similar to the first keyword, and determines a matched component node as the first target component associated with the service semantic information. For example, the first target type includes subnodes corresponding to component 1, component 2, and component 3 respectively. If the first keyword is compared with component 2, component 2 is determined as the first target component. Optionally, the computer device can retrieve the item knowledge graph based on the B service keywords by using semantic retrieval and comparing algorithm. When type nodes that match the semantics of the B service keywords are retrieved, service types corresponding to all the matched type nodes are determined as latent target types, the service types in the latent target types are further compared with the B service keywords, and service types that match the B service keywords are determined as the first target type. The first target type can be a service type corresponding to virtual asset-associated data that needs to be retrieved and is indicated by the service semantic information.

It can be noted that when the computer device performs comparison between nodes based on the service keywords and the item knowledge graph or the first graph subtree (the first service data set), the computer device can construct a retrieval statement (e.g., an SPARQL retrieval statement) based on the service keywords, and perform retrieval comparison in the item knowledge graph or the first graph subtree based on the retrieval statement. When retrieval comparison is performed, a comparing degree between the node and the service keyword can be determined. A manner for determining the comparing degree can be exact comparing (i.e. checking whether a label or an attribute of the node is completely consistent with the service keyword), fuzzy comparing (determining the similarity between the node and the service keyword), and semantic comparing (using the NLP technology to understand the semantics of the service keyword and compare it with a semantic feature of the node), etc., which are not limited herein.

S405, information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

In implementations of the present disclosure, for a data vectorized classification storage manner during data storage, after the computer device determines the first target component, if there is one data vectorized result of the first target component in the classified data corresponding to the first target type, i.e., the target component asset data corresponding to the data vectorized result only includes one virtual asset-associated data, the computer device can directly determine virtual asset-associated data corresponding to the data vectorized result as the retrieval content associated with the first target component. If there are multiple data vectorized results of the first target component, i.e., the target component asset data corresponding to the data vectorized result includes multiple virtual asset-associated data, the computer device can determine service keywords other than a service keyword that match the component vectorized result corresponding to the first target component among the remaining service keywords as to-be-retrieved keywords, perform comparison between key keyword vectors corresponding to the to-be-retrieved keywords with the multiple data vectorized results of the first target component in the first service data set, and determine virtual asset-associated data corresponding to a matched data vectorized result as the retrieval content associated with the first target component. Optionally, the computer device can also determine a data parsing result corresponding to the virtual asset-associated data as the retrieval content, where the data parsing result is an editable text obtained by performing text parsing on the virtual asset-associated data based on the file type corresponding to the virtual asset-associated data. It can be understood that there is a unique mapping relationship between the data vectorized result and the virtual asset-associated data, and the computer device can directly obtain the virtual asset-associated data corresponding to the data vectorized result according to the data vectorized result.

Optionally, for a data structured classification storage manner during data storage, after the computer device determines the first target component, the computer device can determine a service keyword other than a service keyword indicating the service type and the service keyword indicating the component among the B service keywords as a to-be-matched keyword. The computer device can compare the to-be-matched keyword with each child node of the first target component in the first service data set, and determine structured component asset subdata corresponding to a matched data child node as the retrieval content associated with the first target component.

Further, the computer device can generate the service result for the service processing request text based on the intention requirement information and the retrieval content. Specifically, the computer device can identify key information of the retrieval content to obtain key data. If the intention requirement information indicates a data analysis requirement, the computer device can perform data analysis on the key data based on the intention requirement information to obtain a data analysis result, and determine the data analysis result as the service result for the service processing request text. Specifically, the computer device can obtain Q retrieval data for the key data and the intention requirement information, and extract features of the Q retrieval data respectively by using the LLM to obtain Q first extracted features, where Q is a positive integer. The Q retrieval data can come from retrieval results obtained by the computer device through one or more different retrieval engines based on the key data and the intention requirement information. The computer device can extract a feature of the key data by using the LLM to obtain a second extracted feature, and perform cross-attention on the Q first extracted features and the second extracted feature to obtain attention scores corresponding to the Q first extracted features respectively. For a possible implementation for performing cross-attention, reference can be made to formula ②:

$$\text{Attention}(Q, K, V) = \text{softmax}\left(\frac{QK^T}{\sqrt{d_k}}\right)V \qquad ②$$

As illustrated in formula ②, Attention(Q, K, V) indicates a cross-attention function, Q indicates a retrieval vector query, K indicates a key vector key, V indicates a value vector value, T indicates transpose, $K^T$ indicates a transposed matrix of K. The computer device can determine the first extracted feature as the retrieval vector and determine the second extracted feature as the key vector and the value vector. $d_k$ indicates the number of dimensions corresponding to the second extracted feature, and a calculated result of $$\text{softmax}\left(\frac{QK^T}{\sqrt{d_k}}\right)V$$

indicates the cross-attention score.

The computer device can determine retrieval data associated with an attention score greater than or equal to an attention threshold among the Q attention scores as the data analysis result. The attention threshold can be manually specified. Optionally, the computer device can determine retrieval data corresponding to the maximum score among the Q attention scores as the data analysis result.

Optionally, if the intention requirement information indicates a drawing processing requirement, the computer device can draw a graph based on the intention requirement information and the key data to obtain a drawing data graph, and determine the drawing data graph as the service result for the service processing request text. Specifically, the computer device can identify a drawing graph type according to the intention requirement information, obtain a graph template of the drawing graph type from a graph template library, generate a Gaussian noise graph according to the graph template and initial noise data, and input the Gaussian noise graph, the key data, and the intention requirement information into a text-to-image model. The graph template library includes various types of graph templates, such as a statistical graph, a histogram, a line chart, etc., which are graph templates for mathematical statistical analysis. The computer device can extract a feature of the Gaussian noise graph by using the text-to-image model to obtain a mean vector and a variance vector of the Gaussian noise graph. The mean vector can be an average value of all pixel values of the Gaussian noise graph on each channel, i.e., a first-order statistic of the Gaussian noise graph. The variance vector can be an average value of variance of the pixel values on each channel, i.e., a second-order statistic of the Gaussian noise graph. The computer device can randomly sample the mean vector and the variance vector of the Gaussian noise graph to obtain a latent mean vector and a latent variance vector, and generate the Gaussian noise feature based on the latent mean vector and the latent variance vector. Further, the computer device obtains a latent variable distribution in a forward diffusion network layer of the text-to-image model, where the latent variable distribution is a conceptual distribution with noise being added, which can be, for example, a Gaussian distribution. The computer device can continuously add a random noise vector to the Gaussian noise feature in T time steps to obtain a forward noise vector, where T is a positive integer, the time step refers to the amplitude of adding noise to the Gaussian noise feature based on the latent variable distribution, and the noise can refer to unnecessary or redundant interference information present in image data. When Tis large enough, the forward noise vector can indicate a fully-noisy image.

The computer device can perform feature coding on the key data in a text-coding layer in the text-to-image model to obtain a data coding feature, perform feature coding on the intention requirement information in the text-coding layer to obtain an intention coding feature, and concatenate the data coding feature and the intention coding feature to obtain a concatenated coding feature. The computer device can denoise the Gaussian noise graph according to the forward noise vector and the concatenated coding feature to obtain the drawing data graph. In other words, the computer device continuously performs noise prediction on the forward noise vector by means of the concatenated coding feature in T time steps to obtain a predicted noise vector, and denoises the forward noise vector by means of the predicted noise vector to obtain a target latent vector. The computer device can perform image reconstruction on the target latent vector by using a decoder in the text-to-image model to obtain a target predicted image, and determine the target predicted graph as the drawing data graph for the intention requirement information and the key data. The target latent vector indicates a feature of the target predicted graph, i.e., a potential representation of the target predicted image after being denoised in latent space. Further, the computer device can display the intelligent avatar and the intelligent message text box that is associated with the intelligent avatar and include the service result on the intelligent conversation page, where the intelligent avatar is used for performing conversational interaction with the object avatar on the intelligent conversation page.

S406, when a data update request for a second target component sent by the first service object is obtained on the intelligent conversation page, the data in the service database is updated based on the data update request.

In implementations of the present disclosure, when the data update request for the second target component sent by the first service object is obtained by the computer device on the intelligent conversation page, if a data storage manner in the service database is the vectorized classification storage manner, the computer device can obtain to-be-matched asset data of the second target component from each type of the N types of classified data based on the data update request, where the at least two components of which the aircraft is composed include the second target component, the data update request includes component update data of the second target component, and the to-be-matched asset data includes component asset data of the second target component in each type of the N types of classified data. For example, there is component asset data 1a (including virtual asset-associated data a and virtual asset-associated data b) of the second target component in classified data 1, there is component asset data 1b (including virtual asset-associated data c) of the second target component in classified data 2, and there is component asset data 1c (including virtual asset-associated data d and virtual asset-associated data f) of the second target component in classified data 3. Therefore, the to-be-matched asset data includes virtual asset-associated data a, virtual asset-associated data b, virtual asset-associated data c, virtual asset-associated data d, and virtual asset-associated data f.

The computer device can compare the to-be-matched asset data with the component update data, vectorize the component update data to obtain vectorized update data if the component update data is absent in the to-be-matched asset data, store the vectorized update data in the service database associated with the first service object, generate a data update success notification, and display the data update success notification in the intelligent message text box on the intelligent conversation page. For example, if the component asset data is virtual asset-associated data g, that is, virtual asset-associated data g is absent in the to-be-matched asset data (including virtual asset-associated data a, virtual asset-associated data b, virtual asset-associated data c, virtual asset-associated data d, and virtual asset-associated data f), the computer device can vectorize virtual asset-associated data g to obtain vectorized update data, and store the vectorized update data in the service database associated with the first service object. It can be noted that the data vectorized results obtained after the virtual asset-associated data of different service types are vectorized have very different coordinate positions in the vector space. For example, a vector position of a data vectorized result corresponding to the virtual asset-associated data of classified data 1 in the vector space is located in space area A1, a vector position of a data vectorized result corresponding to the virtual asset-associated data of classified data 2 in the vector space is located in space area A2, and a vector position of a data vectorized result corresponding to the virtual asset-associated data of classified data 3 in the vector space is located in space area A3. In a vector space, space area A1, space area A2, and space area A3 belong to three different areas. Therefore, the computer device can directly classify the virtual asset-associated data of different service types according to different data vectorized results to implement data classification storage in the service database.

Optionally, if the component update data is present in the to-be-matched asset data, a data duplication notification is generated, and the data duplication notification is displayed in the intelligent message text box on the intelligent conversation page. For example, if the component update data is the same as virtual asset-associated data c, that is, the component update data is present in the to-be-matched asset data (including virtual asset-associated data a, virtual asset-associated data b, virtual asset-associated data c, virtual asset-associated data d, and virtual asset-associated data f), the computer device does not need to update the data in the service database.

If the data storage manner in the service database is a structured classification storage manner, the computer device can determine a second target type corresponding to component update data of the second target component based on the component update data in the data update request, where the at least two components of which the aircraft is composed include the second target component, and the N service types include the second target type. The computer device can determine a second graph subtree with the second target type as an initial root node based on the second target type and the item knowledge graph, and obtain a to-be-matched data set of all child nodes with the second target component as a parent node in the second graph subtree.

If the component update data is absent in the to-be-matched data set, that is, the structured component asset subdata in the child nodes in the to-be-matched data set is not compared with the component update data, the computer device can add an updated child node to the parent node corresponding to the second target component in the second graph subtree, convert a format of the component update data to obtain structured component update data, allocate the structured component update data to the updated child node, i.e., the structured component update data is determined as content of the updated child node, to obtain an updated graph subtree. Further, the computer device can update the item knowledge graph based on the updated graph subtree to obtain an updated item knowledge graph, store the updated item knowledge graph in the service database associated with the first service object, generate a data update success notification, and display the data update success notification in the intelligent message text box on the intelligent conversation page. Specifically, the computer device can detect an input (i.e., a process of adding an updated child node to the parent node corresponding to the second target component in the second graph subtree and determining the structured component update data as the content of the updated child node) of new data (the structured component update data) in the second graph subtree by using the incremental learning technology, and further identify changes in data in the second graph subtree, such as the addition of a new entity (an entity corresponding to the structured component update data), the update of existing entity attribute, or the formation of a new relationship. Entity alignment is achieved based on the changes in the data in the second graph subtree, so that the structured component update data is added to the item knowledge graph to obtain the updated graph subtree, thereby ensuring that the updated item knowledge graph obtained by updating a final item knowledge graph can be consistent with the final item knowledge graph, without contradictory or redundant information. Optionally, if the component update data is present in the to-be-matched data set, a data duplication notification is generated, and the data duplication notification is displayed in the intelligent message text box on the intelligent conversation page.

It can be understood that all operations implemented by the computer device in the above process can be completed by the computer device invoked by the intelligent object after the service processing request text or the data update request sent by the first service object is received by the intelligent object.

Through the above process, two different manners of classified storage (vectorized classified storage and structured classified storage) of files (virtual asset-associated data) based on the service type are realized, which reduces the retrieval volume during retrieval and improves the retrieval efficiency. In addition, intelligent management on a file system is implemented by the intelligent object. The intelligent object is used to obtain a service requirement (the service processing request text) of the first service object and parse out the service semantic information of the service processing request text. Based on the service semantic information, targeted intelligent retrieval is performed in the file system based on the service semantic information, and the service result is quickly determined and displayed on the intelligent conversation page. The data is classified and stored based on the N service types, and in a subsequent data reading process of a certain target component (e.g., the first target component) of the aircraft in a certain specified service type (e.g., the first target type), only data corresponding to the first target component in the first target type needs to be retrieved, thus reducing the retrieval threshold, saving data retrieval time, and improving data reading and retrieval efficiency. Further, a whole retrieval process is completed by the intelligent object, thereby saving labor costs.

Figure 6:
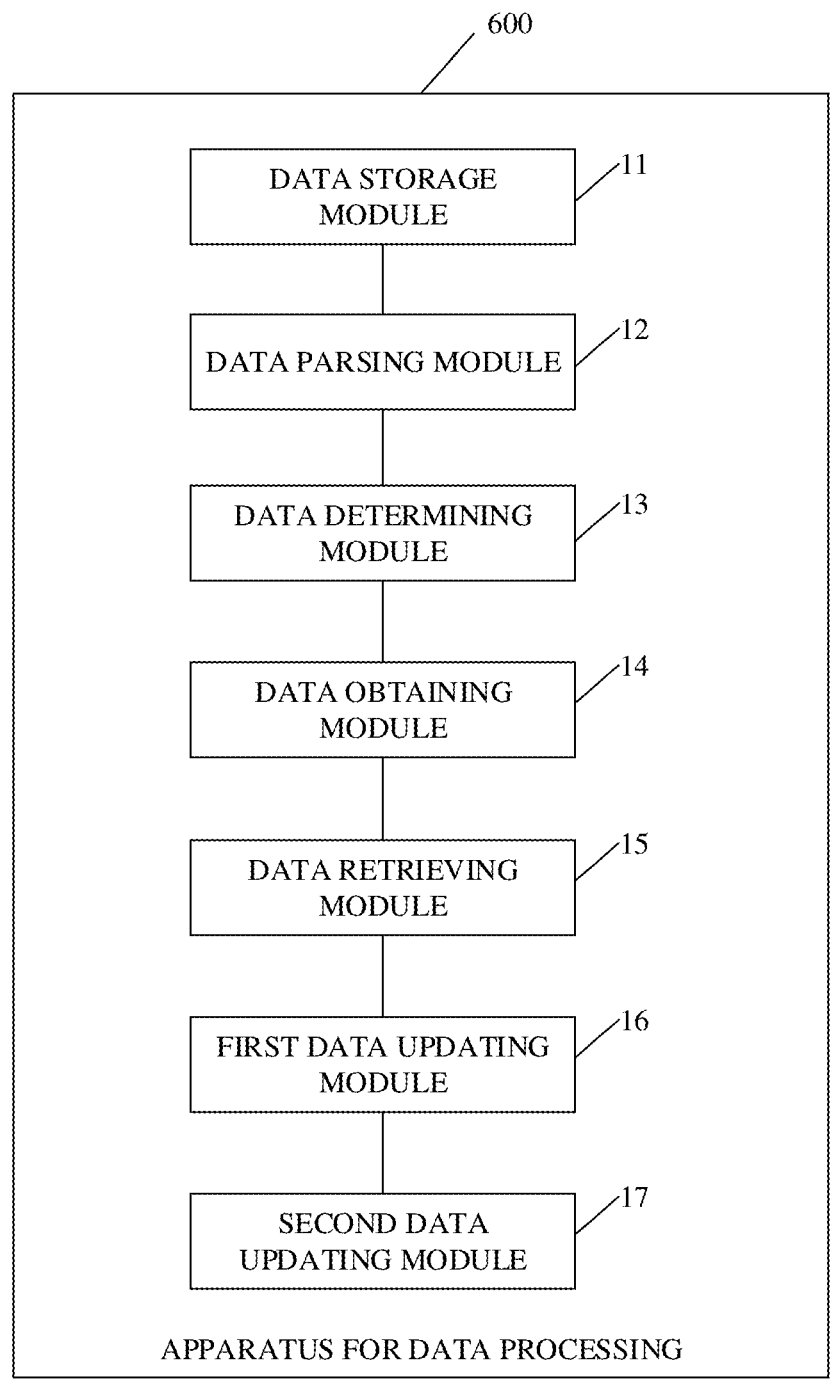
FIG. 6 is a schematic diagram of an apparatus for data processing provided in implementations of the present disclosure.

Further, reference can be made to FIG. 6, which is a schematic diagram of an apparatus for data processing provided in implementations of the present disclosure. The apparatus 600 for data processing may be a computer program (including program code, etc.) that runs on a computer device. For example, the apparatus 600 for data processing may be application software. The apparatus 600 for data processing may be configured to perform corresponding steps in the method provided in implementations of the present disclosure. As illustrated in FIG. 6, the apparatus 600 for data processing is applicable to the computer device in the implementations corresponding to FIG. 3 and FIG. 4. Specifically, the apparatus 600 for data processing can include a data storage module 11, a data parsing module 12, a data determining module 13, a data obtaining module 14, a data retrieving module 15, a first data updating module 16, and a second data updating module 17.

The data parsing module 12 is configured to obtain, on an intelligent conversation page, a service processing request text sent by a first service object and parse the service processing request text to obtain service semantic information and intention requirement information, where the intelligent conversation page includes an object avatar of the first service object and an object message text box associated with the object avatar, and the object message text box includes the service processing request text.

The data determining module 13 is configured to obtain a first object identifier of the first service object and determine a service database associated with the first object identifier based on the first object identifier, where the service database includes storage data associated with virtual asset-associated data corresponding to N service types respectively, virtual asset-associated data corresponding to each of the N service types includes component asset data of at least one component of an aircraft, and N is a positive integer.

The data obtaining module 14 is configured to obtain a first target type indicated by the service semantic information, obtain, from classified data corresponding to the N service types in the service database respectively, a first service data set of the first target type, and determine a first target component associated with the service semantic information based on the service semantic information, where the N service types include the first target type.

The data retrieving module 15 is configured to perform information retrieval in the first service data set to obtain retrieval content associated with the first target component, generate a service result for the service processing request text based on the intention requirement information and the retrieval content, and display, on the intelligent conversation page, an intelligent avatar and an intelligent message text box that is associated with the intelligent avatar and includes the service result, where the intelligent avatar is used for performing conversational interaction with the object avatar on the intelligent conversation page.

In a possible implementation, the apparatus 600 for data processing further includes the data storage module 11. The data storage module 11 is specifically configured to operate as follows. Virtual asset-associated data of the aircraft sent by the first service object is obtained, where the aircraft is composed of at least two components. An asset data classification rule is obtained, and the virtual asset-associated data of the aircraft is classified according to N service types in the asset data classification rule to obtain N types of classified data, where each of the N types of classified data corresponds to one service type. The storage data is generated according to the N types of classified data, and the storage data is stored in the service database associated with the first service object.

In a possible implementation, the N service types include an asset service data type, a basic service data type, and a transaction service data type. The N types of classified data include first classified data, second classified data, and third classified data. When the data storage module 11 is configured to classify the virtual asset-associated data of the aircraft according to the N service types in the asset data classification rule to obtain the N types of classified data, the data storage module 11 is specifically configured to operate as follows. A data key field corresponding to the asset service data type is obtained, where the data key field includes a usage record key field, a maintenance record key field, and a depreciation record key field. A previous usage record corresponding to the usage record key field, a previous maintenance record corresponding to the maintenance record key field, and a previous depreciation record corresponding to the depreciation record key field are obtained from the virtual asset-associated data of the aircraft, and the previous usage record, the previous maintenance record, and the previous depreciation record are determined as the first classified data corresponding to the asset service data type. A factory key field corresponding to the basic service data type is obtained, factory-associated data corresponding to the factory key field is obtained from the virtual asset-associated data of the aircraft, and the factory-associated data is determined as the second classified data corresponding to the basic service data type. A transaction key field corresponding to the transaction service data type is obtained, transaction-associated data corresponding to the transaction key field is obtained from the virtual asset-associated data of the aircraft, and the transaction-associated data is determined as the third classified data corresponding to the transaction service data type.

In a possible implementation, the N types of classified data include classified data $S_i$, and i is a positive integer less than or equal to N. The components of the aircraft include component $M_j$, and j is a positive integer. The classified data $S_i$ includes component asset data corresponding to A components respectively. The A components belong to the at least two components of the aircraft. The A components include the component M$_j$, and A is a positive integer. When the data storage module 11 is configured to generate the storage data according to the N types of classified data and store the storage data in the service database associated with the first service object, the data storage module 11 is specifically configured to operate as follows. A service type corresponding to the classified data S$_i$ is vectorized to obtain a type vectorized result. The A components are vectorized respectively to obtain A component vectorized results. A target component asset data of the component M$_j$ in the classified data S$_i$ is obtained, and text parsing is performed on the target component asset data based on a file type corresponding to the target component asset data to obtain a data parsing result corresponding to the target component asset data. The data parsing result is vectorized to obtain a data vectorized result corresponding to the target component asset data. The type vectorized result, the component vectorized result, and the data vectorized result are determined as the storage data, and the storage data is stored in the service database associated with the first service object.

In a possible implementation, the N types of classified data include the classified data S$_i$, and i is a positive integer less than or equal to N. The components of the aircraft include the component M$_j$, and j is a positive integer. The classified data S$_i$ includes the component asset data corresponding to the A components respectively. The A components belong to the at least two components of the aircraft. The A components include the component M$_j$, and A is a positive integer. When the storage data is configured to generate the storage data according to the N types of classified data and store the storage data in the service database associated with the first service object, the storage data is specifically configured to operate as follows. A service type corresponding to the classified data S$_i$ is determined as an initial root node, and the A components are determined as A parent nodes of the initial root node. The target component asset data of the component M$_j$ in the classified data S$_i$ is obtained, and formats of P component asset subdata in the target component asset data respectively are converted to obtain P structured component asset subdata, where P is a positive integer. The P structured component asset subdata is allocated to child nodes of a parent node corresponding to the component M$_j$ respectively. When the child nodes of the parent nodes corresponding to the A components respectively are generated, the initial root node, the A parent nodes, and child nodes corresponding to the A parent nodes respectively are determined as a graph subtree of the classified data S$_i$, where one structured component asset subdata is allocated to one child node. When graph subtrees corresponding to the N types of classified data respectively are obtained, the aircraft is determined as a graph root node, an item knowledge graph corresponding to the aircraft is generated based on the N graph subtrees and the graph root node, the item knowledge graph is determined as the storage data, and the storage data is stored in the service database associated with the first service object.

In a possible implementation, when the data determining module 13 is configured to obtain the first target type indicated by the service semantic information, obtain, from the classified data corresponding to the N service types in the service database respectively, the first service data set of the first target type, and determine the first target component associated with the service semantic information based on the service semantic information, the data determining module 13 is specifically configured to operate as follows. Keywords of the service semantic information are extracted to obtain B service keywords, each of the B service keywords is vectorized to obtain B keyword vectors, vector similarity comparison is performed between the B keyword vectors and type vectorized results corresponding to the N service types respectively, and a service type corresponding to a matched type vectorized result is determined as the first target type, where B is a positive integer. The first service data set of the first target type is obtained from the classified data corresponding to the N service types in the service database respectively. Vector similarity comparison is performed between keyword vectors corresponding to remaining service keywords respectively and a component vectorized result corresponding to each component in the first service data set respectively, and a component corresponding to a matched component vectorized result is determined as the first target component associated with the service semantic information, where the remaining service keywords are service keywords other than a service keyword that matches the type vectorized result corresponding to the first target type among the B service keywords.

In a possible implementation, the apparatus 600 for data processing further includes the first data updating module 16. The first data updating module 16 is specifically configured to operate as follows. When the data update request for the second target component sent by the first service object is obtained on the intelligent conversation page, to-be-matched asset data of the second target component is obtained from each type of the N types of classified data based on the data update request, where the at least two components include the second target component, the data update request includes component update data of the second target component, and the to-be-matched asset data includes component asset data of the second target component in each type of the N types of classified data. The to-be-matched asset data is compared with the component update data, the component update data is vectorized to obtain vectorized update data when the component update data is absent in the to-be-matched asset data, the vectorized update data is stored in the service database associated with the first service object, a data update success notification is generated, and the data update success notification is displayed in the intelligent message text box on the intelligent conversation page. A data duplication notification is generated when the component update data is present in the to-be-matched asset data, and the data duplication notification is displayed in the intelligent message text box on the intelligent conversation page.

In a possible implementation, when the data determining module 13 is configured to obtain the first target type indicated by the service semantic information, obtain, from the classified data corresponding to the N service types in the service database respectively, the first service data set of the first target type, and determine the first target component associated with the service semantic information based on the service semantic information, the data determining module 13 is specifically configured to operate as follows. The keywords of the service semantic information are extracted to obtain the B service keywords, where B is a positive integer. The item knowledge graph is traversed based on the B service keywords, and a service type corresponding to a type node that matches the B service keywords is determined as the first target type when the matched type node is traversed. A first graph subtree with the first target type as an initial root node is obtained from the item knowledge graph, and the first graph subtree is determined as the first service data set, where N graph subtrees in the item knowledge graph include the first graph subtree. The first service data set is traversed based on a first keyword, and a component node that matches the first keyword is determined as the first target component associated with the service semantic information when the matched component node is traversed, where the first keyword is a service keyword indicating a component among the B service keywords. When the data retrieving module 15 is configured to perform information retrieval in the first service data set to obtain the retrieval content associated with the first target component, the data retrieving module 15 is specifically configured to operate as follows. A service keyword other than a service keyword indicating the service type and the service keyword indicating the component among the B service keywords is determined as a to-be-matched keyword. The to-be-matched keyword is compared with each child node of the first target component in the first service data set, and structured component asset subdata corresponding to a matched data child node is determined as the retrieval content associated with the first target component.

In a possible implementation, the apparatus 600 for data processing further includes the second data updating module 17. The second data updating module 17 is specifically configured to operate as follows. When the data update request for the second target component sent by the first service object is obtained on the intelligent conversation page, a second target type corresponding to component update data of the second target component is determined based on the component update data in the data update request, where the at least two components include the second target component, and the N service types include the second target type. A second graph subtree with the second target type as an initial root node is determined based on the second target type and the item knowledge graph, and a to-be-matched data set of all child nodes with the second target component as a parent node in the second graph subtree is obtained. An updated child node is added to the parent node corresponding to the second target component in the second graph subtree when the component update data is absent in the to-be-matched data set, the component update data is allocated to the updated child node to obtain an updated graph subtree, the item knowledge graph is updated based on the updated graph subtree to obtain an updated item knowledge graph, the updated item knowledge graph is stored in the service database associated with the first service object, the data update success notification is generated, and the data update success notification is displayed in the intelligent message text box on the intelligent conversation page. The data duplication notification is generated when the component update data is present in the to-be-matched data set, and the data duplication notification is displayed in the intelligent message text box on the intelligent conversation page.

In a possible implementation, when the data retrieving module 15 is configured to generate
  the service result for the service processing request text based on the intention requirement information and the retrieval content, the data retrieving module 15 is specifically configured to operate as follows. Key information of the retrieval content is identified to obtain key data. Data analysis is performed on the key data based on the intention requirement information to obtain a data analysis result when the intention requirement information indicates a data analysis requirement, and the data analysis result is determined as a service result for the service processing request text. A graph is drawn based on the intention requirement information and the key data to obtain a drawing data graph when the intention requirement information indicates a drawing processing requirement, and the drawing data graph is determined as the service result for the service processing request text.

In a possible implementation, when the data retrieving module 15 is configured to perform data analysis on the key data based on the intention requirement information to obtain the data analysis result, the data retrieving module 15 is specifically configured to operate as follows. Q retrieval data for the key data and the intention requirement information is obtained, and features of the Q retrieval data respectively are extracted by using a large language model (LLM) to obtain Q first extracted features, where Q is a positive integer. A feature of the key data is extracted by using the LLM to obtain a second extracted feature, and cross-attention is performed on the Q first extracted features and the second extracted feature to obtain attention scores corresponding to the Q first extracted features respectively. Retrieval data associated with an attention score greater than or equal to an attention threshold among the Q attention scores is determined as the data analysis result.

In a possible implementation, when the data retrieving module 15 is configured to draw the graph based on the intention requirement information and the key data to obtain the drawing data graph, the data retrieving module 15 is specifically configured to operate as follows. A drawing graph type is identified according to the intention requirement information, a graph template of the drawing graph type is obtained from a graph template library, a Gaussian noise graph is generated according to the graph template and initial noise data, and the Gaussian noise graph, the key data, and the intention requirement information are input into a text-to-image model. A feature of the Gaussian noise graph is extracted by using the text-to-image model to obtain a Gaussian noise feature, and forward diffusion is performed on the Gaussian noise feature to obtain a forward noise vector. Feature coding is performed on the key data by using the text-to-image model to obtain a data coding feature, feature coding is performed on the intention requirement information to obtain an intention coding feature, and the data coding feature and the intention coding feature are concatenated to obtain a concatenated coding feature. The Gaussian noise graph is denoised according to the forward noise vector and the concatenated coding feature to obtain the drawing data graph.

Figure 7:
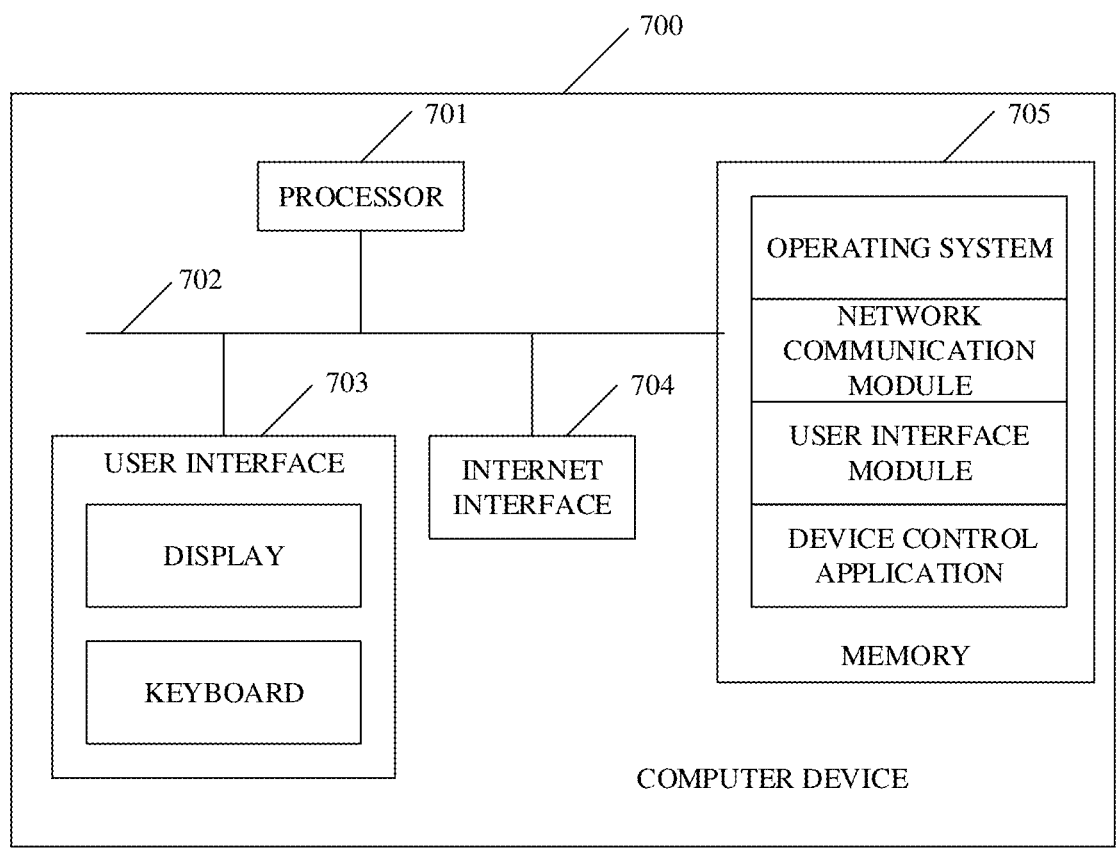
FIG. 7 is a schematic structural diagram of a computer device provided in implementations of the present disclosure.

Reference can be made to FIG. 7, which is a schematic structural diagram of a computer device provided in implementations of the present disclosure. As illustrated in FIG. 7, the computer device in implementations of the present disclosure can include a processor 701, a network interface 704, and a memory 705. In addition, the computer device 700 can further include a user interface 703, and at least one communication bus 702. The communication bus 702 is configured to implement the connection and communication between these components. The user interface 703 can include a display, a keyboard, and optionally, the user interface 703 may also include a standard wired interface and a wireless interface. The network interface 704 may optionally include a standard wired interface and a wireless interface (such as a WI-FI interface). The memory 705 may be a high-speed RAM memory or a non-volatile memory, such as at least one disk memory. The memory 705 may optionally also be at least one storage apparatus away from the processor 701. As illustrated in FIG. 7, the memory 705 as a computer-readable storage medium can include an operating system, a network communication module, a user interface module, and a device control application.

The network interface 704 can provide a network communication network element (NE). The user interface 703 is mainly used for providing an input interface for the user. The processor 701 can be used to invoke the device control application stored in the memory 705 to operate as follows. A service processing request text sent by a first service object is obtained on an intelligent conversation page, and the service processing request text is parsed to obtain service semantic information and intention requirement information, where the intelligent conversation page includes an object avatar of the first service object and an object message text box associated with the object avatar, and the object message text box includes the service processing request text. A first object identifier of the first service object is obtained, and a service database associated with the first object identifier is determined based on the first object identifier, where the service database includes storage data associated with virtual asset-associated data corresponding to N service types respectively, virtual asset-associated data corresponding to each of the N service types includes component asset data of at least one component of an aircraft, and N is a positive integer. A first target type indicated by the service semantic information is obtained, a first service data set of the first target type is obtained from classified data corresponding to the N service types in the service database respectively, and a first target component associated with the service semantic information is determined based on the service semantic information, where the N service types include the first target type. Information retrieval is performed in the first service data set to obtain retrieval content associated with the first target component, a service result for the service processing request text is generated based on the intention requirement information and the retrieval content, and an intelligent avatar and an intelligent message text box that is associated with the intelligent avatar and includes the service result are displayed on the intelligent conversation page, where the intelligent avatar is used for performing conversational interaction with the object avatar on the intelligent conversation page.

In addition, it can be noticed that implementations of the present disclosure further provide a computer-readable storage medium. The computer-readable instructions are suitable for a processor to load and execute. The computer-readable storage medium is configured to store a computer program that is suitable for a processor to load and execute the method provided in each step in FIG. 3 or FIG. 4. For details, reference can be made to implementations provided in each step in FIG. 3 or FIG. 4, which are not repeated herein. In addition, beneficial effects achieved by using the same method are not described herein again. For technical details that are not disclosed in the implementations of the computer-readable storage medium, reference can be made to the descriptions of the method implementations of the present disclosure. As an example, the computer program may be deployed to be executed on a computer device, or deployed to be executed on multiple computer devices at the same location, or deployed to be executed on multiple computer devices that are distributed in multiple locations and interconnected through a communication network.

The computer-readable storage medium may be the apparatus provided in any one of the foregoing implementations or an internal storage unit of the computer device, for example, a hard disk or a memory of the computer device. The computer-readable storage medium may also be an external storage device of the computer device, for example, a removable hard disk, a smart memory card (SMC), a secure digital (SD) card, or a flash card equipped on the computer device. Further, the computer-readable storage medium may further include both the internal storage unit and the external storage device of the computer device. The computer-readable storage medium is configured to store the computer program and other programs and data that are required by the computer device. The computer-readable storage medium may further be configured to temporarily store data that has been output or data to be output.

Implementations of the present disclosure further provide a computer program product or a computer program. The computer program product or the computer program includes computer instructions stored in a computer-readable storage medium. A processor of a computer device reads the computer instructions stored in the computer-readable storage medium, and the processor executes the computer instructions, to cause the computer device to perform the method provided in various optional manners in FIG. 3 or FIG. 4, and therefore, which are not repeated herein.

It can be understood that, the terms "first", "second", and the like used in the specification, the claims, and the accompanying drawings of implementations of the present disclosure are used to distinguish different objects rather than describe a particular order. In addition, the terms "include", "comprise", and "have" as well as variations thereof are intended to cover a non-exclusive inclusion. For example, a process, method, apparatus, product, or device that includes a series of operations or units is not limited to the listed operations or modules, and instead, it can optionally further include other operations or modules that are not listed, or can optionally further include other operations or units inherent to the process, method, product, or device.

In implementations of the present disclosure, the term "module" or "unit" refers to a computer program or a part of the computer program that has a predetermined function, works together with other related parts to achieve a predetermined goal, and can be implemented completely or partially by using software, hardware (such as a processing circuit or a memory), or a combination thereof. Similarly, a processor (or multiple processors or memories) can be used to implement one or more modules or units. In addition, each module or unit can be a part of an overall module or unit that includes the functions of the module or unit.

Those of ordinary skill in the art will appreciate that units and algorithmic operations of various examples described in connection with implementations of the present disclosure can be implemented by electronic hardware, computer software, or by a combination of computer software and electronic hardware. In order to describe interchangeability between hardware and software, the contents and operations of each implementation have been generally described according to functions in the above description. Whether these functions are performed by means of hardware or software depends on the application and the design constraints of the associated technical solution. Those skilled in the art may use different methods with regard to each particular application to implement the described functionality, but such methods can not be regarded as lying beyond the scope of the present disclosure.

The method and related apparatus provided in implementations of the present disclosure are described herein with reference to method flowcharts and/or schematic structural diagrams provided in implementations of the present disclosure. Specifically, each flow and/or block in the method flowchart and/or schematic structural diagram, and a combination of flow and/or block in the flowchart and/or block diagram can be implemented by computer program instructions. The computer program instructions may be provided to a general-purpose computer, a special-purpose computer, an embedded processor, or a processor of other programmable devices to form a machine, such that apparatus for implementing functions specified by one or more flows in the flowchart and/or one or more blocks in the schematic structural diagram may be generated by executing the instructions with the computer or the processor of other programmable devices. The computer program instructions may also be stored in a computer-readable that can direct the computer or other programmable devices to operate in a specific manner, so that the instructions stored in the computer-readable memory produce a manufactured article including an instruction apparatus, or may be transmitted through the computer-readable storage medium. The computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The instruction apparatus implements the functions specified by one or more flows in the flowchart and/or one or more blocks in the schematic structural diagram. The computer program instructions may also be loaded onto the computer or other programmable devices, such that a series of operations may be executed on the computer or other programmable devices to produce processing implemented by the computer, as such, the instructions executed on the computer or other programmable devices provide operations for implementing the functions specified by one or more flows in the flowchart and/or one or more blocks in the structural diagram.

The operations of the method of implementations of the present disclosure can be adjusted in order, combined, and deleted according to actual needs.

The modules in the apparatus of implementations of the present disclosure can be merged, divided, and deleted according to actual needs.

The above is only preferable implementations of the present disclosure, and certainly are not used to limit the scope of the claims of implementations of the present disclosure. Therefore, any equivalent substitution made on the basis of the claims of the present disclosure shall be included in the protection scope of implementations of the present disclosure.

What is claimed is:

1. A method for data processing, comprising:
obtaining, on an intelligent conversation page, a service processing request text sent by a first service object, and parsing the service processing request text to obtain service semantic information and intention requirement information; whereon the intelligent conversation page comprises an object avatar of the first service object and an object message text box associated with the object avatar, and the object message text box comprises the service processing request text;
obtaining a first object identifier of the first service object, and determining a service database associated with the first object identifier based on the first object identifier; wherein the service database comprises storage data associated with virtual asset-associated data corresponding to N service types respectively, virtual asset-associated data corresponding to each of the N service types comprises component asset data of at least one component of an aircraft, and N is a positive integer;
obtaining a first target type indicated by the service semantic information, obtaining, from classified data corresponding to the N service types in the service database respectively, a first service data set of the first target type, and determining a first target component associated with the service semantic information based on the service semantic information; wherein the N service types comprise the first target type; and
performing information retrieval in the first service data set to obtain retrieval content associated with the first target component, generating a service result for the service processing request text based on the intention requirement information and the retrieval content, and displaying, on the intelligent conversation page, an intelligent avatar and an intelligent message text box that is associated with the intelligent avatar and comprises the service result; wherein the intelligent avatar is used for performing conversational interaction with the object avatar on the intelligent conversation page.

2. The method of claim 1, further comprising:
obtaining virtual asset-associated data of the aircraft sent by the first service object, wherein the aircraft is composed of at least two components;
obtaining an asset data classification rule, and classifying the virtual asset-associated data of the aircraft according to N service types in the asset data classification rule to obtain N types of classified data; wherein each of the N types of classified data corresponds to one service type; and
generating the storage data according to the N types of classified data, and storing the storage data in the service database associated with the first service object.

3. The method of claim 2, wherein the N service types comprise an asset service data type, a basic service data type, and a transaction service data type; the N types of classified data comprise first classified data, second classified data, and third classified data; and classifying the virtual asset-associated data of the aircraft according to the N service types in the asset data classification rule to obtain the N types of classified data comprises:
obtaining a data key field corresponding to the asset service data type, wherein the data key field comprises a usage record key field, a maintenance record key field, and a depreciation record key field;
obtaining, from the virtual asset-associated data of the aircraft, a previous usage record corresponding to the usage record key field, a previous maintenance record corresponding to the maintenance record key field, and a previous depreciation record corresponding to the depreciation record key field, and determining the previous usage record, the previous maintenance record, and the previous depreciation record as the first classified data corresponding to the asset service data type;
obtaining a factory key field corresponding to the basic service data type, obtaining, from the virtual asset-associated data of the aircraft, factory-associated data corresponding to the factory key field, and determining the factory-associated data as the second classified data corresponding to the basic service data type; and
obtaining a transaction key field corresponding to the transaction service data type, obtaining, from the virtual asset-associated data of the aircraft, transaction-associated data corresponding to the transaction key field, and determining the transaction-associated data as the third classified data corresponding to the transaction service data type.

4. The method of claim 2, wherein the N types of classified data comprise classified data $S_i$, and i is a positive integer less than or equal to N; the components of the aircraft comprise component $M_j$, and j is a positive integer; the classified data $S_i$ comprises component asset data corresponding to A components respectively; the A components belong to the at least two components of the aircraft; the A components comprise the component $M_j$, and A is a positive integer; generating the storage data according to the N types of classified data and storing the storage data in the service database associated with the first service object comprise:

vectorizing a service type corresponding to the classified data $S_i$, to obtain a type vectorized result;

vectorizing the A components respectively to obtain A component vectorized results;

obtaining a target component asset data of the component $M_j$ in the classified data $S_i$, and performing text parsing on the target component asset data based on a file type corresponding to the target component asset data to obtain a data parsing result corresponding to the target component asset data;

vectorizing the data parsing result to obtain a data vectorized result corresponding to the target component asset data; and determining the type vectorized result, the component vectorized result, and the data vectorized result as the storage data, and storing the storage data in the service database associated with the first service object.

5. The method of claim 2, wherein the N types of classified data comprise classified data $S_i$, and i is a positive integer less than or equal to N; the components of the aircraft comprise component $M_j$, and j is a positive integer; the classified data $S_i$ comprises component asset data corresponding to A components respectively; the A components belong to the at least two components of the aircraft; the A components comprise the component $M_j$, and A is a positive integer; generating the storage data according to the N types of classified data and storing the storage data in the service database associated with the first service object comprise:

determining a service type corresponding to the classified data $S_i$, as an initial root node, and determining the A components as A parent nodes of the initial root node;

obtaining a target component asset data of the component $M_j$ in the classified data $S_i$, and converting formats of P component asset subdata in the target component asset data respectively to obtain P structured component asset subdata; wherein P is a positive integer;

allocating the P structured component asset subdata to child nodes of a parent node corresponding to the component $M_j$ respectively;

determining the initial root node, the A parent nodes, and child nodes corresponding to the A parent nodes respectively as a graph subtree of the classified data $S_i$ in response to generating the child nodes of the parent nodes corresponding to the A components respectively, wherein one structured component asset subdata is allocated to one child node; and in response to graph subtrees corresponding to the N types of classified data respectively being obtained, determining the aircraft as a graph root node, generating an item knowledge graph corresponding to the aircraft based on the N graph subtrees and the graph root node, determining the item knowledge graph as the storage data, and storing the storage data in the service database associated with the first service object.

6. The method of claim 4, wherein obtaining the first target type indicated by the service semantic information, obtaining, from the classified data corresponding to the N service types in the service database respectively, the first service data set of the first target type, and determining the first target component associated with the service semantic information based on the service semantic information comprise:

extracting keywords of the service semantic information to obtain B service keywords, vectorizing each of the B service keywords to obtain B keyword vectors, performing vector similarity comparison between the B keyword vectors and type vectorized results corresponding to the N service types respectively, and determining a service type corresponding to a matched type vectorized result as the first target type; wherein B is a positive integer;

obtaining, from the classified data corresponding to the N service types in the service database respectively, the first service data set of the first target type; and performing vector similarity comparison between keyword vectors corresponding to remaining service keywords respectively and a component vectorized result corresponding to each component in the first service data set respectively, and determining a component corresponding to a matched component vectorized result as the first target component associated with the service semantic information; wherein the remaining service keywords are service keywords other than a service keyword that matches the type vectorized result corresponding to the first target type among the B service keywords.

7. The method of claim 4, further comprising:

in response to a data update request for a second target component sent by the first service object being obtained on the intelligent conversation page, obtaining to-be-matched asset data of the second target component from each type of the N types of classified data based on the data update request; wherein the at least two components comprise the second target component, the data update request comprises component update data of the second target component, and the to-be-matched asset data comprises component asset data of the second target component in each type of the N types of classified data;

comparing the to-be-matched asset data with the component update data, vectorizing the component update data to obtain vectorized update data in response to the component update data being absent in the to-be-matched asset data, storing the vectorized update data in the service database associated with the first service object, generating a data update success notification, and displaying the data update success notification in the intelligent message text box on the intelligent conversation page; and generating a data duplication notification in response to the component update data being present in the to-be-matched asset data, and displaying the data duplication notification in the intelligent message text box on the intelligent conversation page.

8. The method of claim 5, wherein obtaining the first target type indicated by the service semantic information, obtaining, from the classified data corresponding to the N service types in the service database respectively, the first service data set of the first target type, and determining the first target component associated with the service semantic information based on the service semantic information comprise:

extracting keywords of the service semantic information to obtain B service keywords, wherein B is a positive integer;

traversing the item knowledge graph based on the B service keywords, and determining a service type corresponding to a type node that matches the B service keywords as the first target type in response to the matched type node being traversed;

obtaining, from the item knowledge graph, a first graph subtree with the first target type as an initial root node, and determining the first graph subtree as the first service data set; wherein N graph subtrees in the item knowledge graph comprise the first graph subtree;

traversing the first service data set based on a first keyword, and determining a component node that matches the first keyword as the first target component associated with the service semantic information in response to the matched component node being traversed; wherein the first keyword is a service keyword indicating a component among the B service keywords; and performing information retrieval in the first service data set to obtain the retrieval content associated with the first target component comprises:
- determining a service keyword other than a service keyword indicating the service type and the service keyword indicating the component among the B service keywords as a to-be-matched keyword; and
- comparing the to-be-matched keyword with each child node of the first target component in the first service data set, and determining structured component asset subdata corresponding to a matched data child node as the retrieval content associated with the first target component.

9. The method of claim 5, further comprising:

in response to a data update request for a second target component sent by the first service object being obtained on the intelligent conversation page, determining a second target type corresponding to component update data of the second target component based on the component update data in the data update request, wherein the at least two components comprise the second target component, and the N service types comprise the second target type;

determining a second graph subtree with the second target type as an initial root node based on the second target type and the item knowledge graph, and obtaining a to-be-matched data set of all child nodes with the second target component as a parent node in the second graph subtree;

adding an updated child node to the parent node corresponding to the second target component in the second graph subtree in response to the component update data being absent in the to-be-matched data set, allocating the component update data to the updated child node to obtain an updated graph subtree, updating the item knowledge graph based on the updated graph subtree to obtain an updated item knowledge graph, storing the updated item knowledge graph in the service database associated with the first service object, generating a data update success notification, and displaying the data update success notification in the intelligent message text box on the intelligent conversation page; and generating a data duplication notification in response to the component update data being present in the to-be-matched data set, and displaying the data duplication notification in the intelligent message text box on the intelligent conversation page.

10. The method of claim 1, wherein generating the service result for the service processing request text based on the intention requirement information and the retrieval content comprises:
- identifying key information of the retrieval content to obtain key data;
- performing data analysis on the key data based on the intention requirement information to obtain a data analysis result in response to the intention requirement information indicating a data analysis requirement, and determining the data analysis result as the service result for the service processing request text; and
- drawing a graph based on the intention requirement information and the key data to obtain a drawing data graph in response to the intention requirement information indicating a drawing processing requirement, and determining the drawing data graph as the service result for the service processing request text.

11. The method of claim 10, wherein performing data analysis on the key data based on the intention requirement information to obtain the data analysis result comprises:
- obtaining Q retrieval data for the key data and the intention requirement information, and extracting features of the Q retrieval data respectively by using a large language model (LLM) to obtain Q first extracted features; wherein Q is a positive integer;
- extracting a feature of the key data by using the LLM to obtain a second extracted feature, and performing cross-attention on the Q first extracted features and the second extracted feature to obtain attention scores corresponding to the Q first extracted features respectively; and
- determining retrieval data associated with an attention score greater than or equal to an attention threshold among the Q attention scores as the data analysis result.

12. The method of claim 10, wherein drawing the graph based on the intention requirement information and the key data to obtain the drawing data graph comprises:
- identifying a drawing graph type according to the intention requirement information, obtaining a graph template of the drawing graph type from a graph template library, generating a Gaussian noise graph according to the graph template and initial noise data, and inputting the Gaussian noise graph, the key data, and the intention requirement information into a text-to-image model;
- extracting a feature of the Gaussian noise graph by using the text-to-image model to obtain a Gaussian noise feature, and performing forward diffusion on the Gaussian noise feature to obtain a forward noise vector;
- performing feature coding on the key data by using the text-to-image model to obtain a data coding feature, performing feature coding on the intention requirement information to obtain an intention coding feature, and concatenating the data coding feature and the intention coding feature to obtain a concatenated coding feature; and
- denoising the Gaussian noise graph according to the forward noise vector and the concatenated coding feature to obtain the drawing data graph.

13. A computer device, comprising:
- a memory configured to store a computer program;
- an input/output (I/O) interface configured to receive and output data; and a processor connected to the memory and the I/O interface and configured to invoke the computer program, to cause the computer device to perform:

obtaining, on an intelligent conversation page, a service processing request text sent by a first service object, and parsing the service processing request text to obtain service semantic information and intention requirement information; whereon the intelligent conversation page comprises an object avatar of the first service object and an object message text box associated with the object avatar, and the object message text box comprises the service processing request text;

obtaining a first object identifier of the first service object, and determining a service database associated with the first object identifier based on the first object identifier; wherein the service database comprises storage data associated with virtual asset-associated data corresponding to N service types respectively, virtual asset-associated data corresponding to each of the N service types comprises component asset data of at least one component of an aircraft, and N is a positive integer;

obtaining a first target type indicated by the service semantic information, obtaining, from classified data corresponding to the N service types in the service database respectively, a first service data set of the first target type, and determining a first target component associated with the service semantic information based on the service semantic information; wherein the N service types comprise the first target type; and performing information retrieval in the first service data set to obtain retrieval content associated with the first target component, generating a service result for the service processing request text based on the intention requirement information and the retrieval content, and displaying, on the intelligent conversation page, an intelligent avatar and an intelligent message text box that is associated with the intelligent avatar and comprises the service result; wherein the intelligent avatar is used for performing conversational interaction with the object avatar on the intelligent conversation page.

14. The computer device of claim 13, wherein the processor is further configured to invoke the computer program, to cause the computer device to perform:

obtaining virtual asset-associated data of the aircraft sent by the first service object, wherein the aircraft is composed of at least two components;

obtaining an asset data classification rule, and classifying the virtual asset-associated data of the aircraft according to N service types in the asset data classification rule to obtain N types of classified data; wherein each of the N types of classified data corresponds to one service type; and generating the storage data according to the N types of classified data, and storing the storage data in the service database associated with the first service object.

15. The computer device of claim 14, wherein the N service types comprise an asset service data type, a basic service data type, and a transaction service data type; the N types of classified data comprise first classified data, second classified data, and third classified data; and in terms of classifying the virtual asset-associated data of the aircraft according to the N service types in the asset data classification rule to obtain the N types of classified data, the processor is configured to invoke the computer program, to cause the computer device to perform:

obtaining a data key field corresponding to the asset service data type, wherein the data key field comprises a usage record key field, a maintenance record key field, and a depreciation record key field;

obtaining, from the virtual asset-associated data of the aircraft, a previous usage record corresponding to the usage record key field, a previous maintenance record corresponding to the maintenance record key field, and a previous depreciation record corresponding to the depreciation record key field, and determining the previous usage record, the previous maintenance record, and the previous depreciation record as the first classified data corresponding to the asset service data type;

obtaining a factory key field corresponding to the basic service data type, obtaining, from the virtual asset-associated data of the aircraft, factory-associated data corresponding to the factory key field, and determining the factory-associated data as the second classified data corresponding to the basic service data type; and obtaining a transaction key field corresponding to the transaction service data type, obtaining, from the virtual asset-associated data of the aircraft, transaction-associated data corresponding to the transaction key field, and determining the transaction-associated data as the third classified data corresponding to the transaction service data type.

16. The computer device of claim 14, wherein the N types of classified data comprise classified data $S_i$, and i is a positive integer less than or equal to N; the components of the aircraft comprise component $M_j$, and j is a positive integer; the classified data $S_i$ comprises component asset data corresponding to A components respectively; the A components belong to the at least two components of the aircraft; the A components comprise the component $M_j$, and A is a positive integer; in terms of generating the storage data according to the N types of classified data and storing the storage data in the service database associated with the first service object, the processor is configured to invoke the computer program, to cause the computer device to perform:

vectorizing a service type corresponding to the classified data $S_i$ to obtain a type vectorized result;

vectorizing the A components respectively to obtain A component vectorized results;

obtaining a target component asset data of the component $M_j$ in the classified data $S_i$, and performing text parsing on the target component asset data based on a file type corresponding to the target component asset data to obtain a data parsing result corresponding to the target component asset data;

vectorizing the data parsing result to obtain a data vectorized result corresponding to the target component asset data; and determining the type vectorized result, the component vectorized result, and the data vectorized result as the storage data, and storing the storage data in the service database associated with the first service object.

17. The computer device of claim 14, wherein the N types of classified data comprise classified data $S_i$, and i is a positive integer less than or equal to N; the components of the aircraft comprise component $M_j$, and j is a positive integer; the classified data $S_i$ comprises component asset data corresponding to A components respectively; the A components belong to the at least two components of the aircraft; the A components comprise the component $M_j$, and A is a positive integer; in terms of generating the storage data according to the N types of classified data and storing the storage data in the service database associated with the first service object, the processor is configured to invoke the computer program, to cause the computer device to perform:
  determining a service type corresponding to the classified data $S_i$ as an initial root node, and determining the A components as A parent nodes of the initial root node;
  obtaining a target component asset data of the component $M_j$ in the classified data $S_i$, and converting formats of P component asset subdata in the target component asset data respectively to obtain P structured component asset subdata; wherein P is a positive integer;
  allocating the P structured component asset subdata to child nodes of a parent node corresponding to the component $M_j$ respectively;
  determining the initial root node, the A parent nodes, and child nodes corresponding to the A parent nodes respectively as a graph subtree of the classified data $S_i$ in response to generating the child nodes of the parent nodes corresponding to the A components respectively, wherein one structured component asset subdata is allocated to one child node; and
  in response to graph subtrees corresponding to the N types of classified data respectively being obtained, determining the aircraft as a graph root node, generating an item knowledge graph corresponding to the aircraft based on the N graph subtrees and the graph root node, determining the item knowledge graph as the storage data, and storing the storage data in the service database associated with the first service object.

18. The computer device of claim 16, wherein in terms of obtaining the first target type indicated by the service semantic information, obtaining, from the classified data corresponding to the N service types in the service database respectively, the first service data set of the first target type, and determining the first target component associated with the service semantic information based on the service semantic information, the processor is configured to invoke the computer program, to cause the computer device to perform:
  extracting keywords of the service semantic information to obtain B service keywords, vectorizing each of the B service keywords to obtain B keyword vectors, performing vector similarity comparison between the B keyword vectors and type vectorized results corresponding to the N service types respectively, and determining a service type corresponding to a matched type vectorized result as the first target type; wherein B is a positive integer;
  obtaining, from the classified data corresponding to the N service types in the service database respectively, the first service data set of the first target type; and
  performing vector similarity comparison between keyword vectors corresponding to remaining service keywords respectively and a component vectorized result corresponding to each component in the first service data set respectively, and determining a component corresponding to a matched component vectorized result as the first target component associated with the service semantic information; wherein the remaining service keywords are service keywords other than a service keyword that matches the type vectorized result corresponding to the first target type among the B service keywords.

19. The computer device of claim 16, wherein the processor is further configured to invoke the computer program, to cause the computer device to perform:
  in response to a data update request for a second target component sent by the first service object being obtained on the intelligent conversation page, obtaining to-be-matched asset data of the second target component from each type of the N types of classified data based on the data update request; wherein the at least two components comprise the second target component, the data update request comprises component update data of the second target component, and the to-be-matched asset data comprises component asset data of the second target component in each type of the N types of classified data;
  comparing the to-be-matched asset data with the component update data, vectorizing the component update data to obtain vectorized update data in response to the component update data being absent in the to-be-matched asset data, storing the vectorized update data in the service database associated with the first service object, generating a data update success notification, and displaying the data update success notification in the intelligent message text box on the intelligent conversation page; and
  generating a data duplication notification in response to the component update data being present in the to-be-matched asset data, and displaying the data duplication notification in the intelligent message text box on the intelligent conversation page.

20. A non-transitory computer-readable storage medium configured to store a computer program which, when loaded and executed by a processor, causes a computer device equipped with the processor to perform:
  obtaining, on an intelligent conversation page, a service processing request text sent by a first service object, and parsing the service processing request text to obtain service semantic information and intention requirement information; whereon the intelligent conversation page comprises an object avatar of the first service object and an object message text box associated with the object avatar, and the object message text box comprises the service processing request text;
  obtaining a first object identifier of the first service object, and determining a service database associated with the first object identifier based on the first object identifier; wherein the service database comprises storage data associated with virtual asset-associated data corresponding to N service types respectively, virtual asset-associated data corresponding to each of the N service types comprises component asset data of at least one component of an aircraft, and N is a positive integer;
  obtaining a first target type indicated by the service semantic information, obtaining, from classified data corresponding to the N service types in the service database respectively, a first service data set of the first target type, and determining a first target component associated with the service semantic information based on the service semantic information; wherein the N service types comprise the first target type; and
  performing information retrieval in the first service data set to obtain retrieval content associated with the first target component, generating a service result for the service processing request text based on the intention requirement information and the retrieval content, and displaying, on the intelligent conversation page, an intelligent avatar and an intelligent message text box that is associated with the intelligent avatar and comprises the service result; wherein the intelligent avatar is used for performing conversational interaction with the object avatar on the intelligent conversation page.

\* \* \* \* \*